US006993083B1

(12) United States Patent
Shirakata et al.

(10) Patent No.: US 6,993,083 B1
(45) Date of Patent: Jan. 31, 2006

(54) APPARATUS AND METHOD OF OFDM DEMODULATION

(75) Inventors: Naganori Shirakata, Suita (JP); Tomohiro Kimura, Hirakata (JP); Koichiro Tanaka, Takaraduka (JP); Hideki Nakahara, Kyoto (JP); Yasuo Harada, Kobe (JP); Shuya Hosokawa, Neyagawa (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 1018 days.

(21) Appl. No.: 09/597,764

(22) Filed: Jun. 20, 2000

(30) Foreign Application Priority Data

Jun. 22, 1999 (JP) ............................................. 11/174984

(51) Int. Cl.
*H04L 7/04* (2006.01)

(52) U.S. Cl. ...................... 375/260; 375/364; 375/366; 375/368; 370/485; 370/208

(58) Field of Classification Search ................. 375/354, 375/362, 364, 365–368, 260; 370/208, 480, 370/483, 485
See application file for complete search history.

(56) References Cited

U.S. PATENT DOCUMENTS

| 5,848,107 | A | | 12/1998 | Philips | |
| 6,160,821 | A | * | 12/2000 | Dolle et al. ................. | 370/509 |
| 6,646,980 | B1 | * | 11/2003 | Yamamoto et al. ......... | 370/208 |
| 6,647,025 | B1 | * | 11/2003 | Sudo ........................... | 370/503 |
| 2003/0189894 | A1 | * | 10/2003 | Nee ............................ | 370/208 |

FOREIGN PATENT DOCUMENTS

| EP | 0 615 352 | 9/1994 |
| EP | 0 854 620 | 7/1998 |
| JP | 7-46217 | 2/1995 |
| JP | 10-209998 | 8/1998 |
| JP | 10-294711 | 11/1998 |
| JP | 10-313284 | 11/1998 |
| JP | 11-32025 | 2/1999 |
| WO | 96/19056 | 6/1996 |

OTHER PUBLICATIONS

Keller, T. et al., "Orthogonal Frequency Division Multiplex Synchronisation Techniques for Wireless Local Area Networks", Personal, Indoor and Mobile Radio Communications, Oct. 1996, pp. 963–967.

* cited by examiner

*Primary Examiner*—Amanda T. Le
(74) *Attorney, Agent, or Firm*—Wenderoth, Lind & Ponack, L.L.P.

(57) ABSTRACT

An apparatus and method for OFDM demodulation establish symbol synchronization to minimize between-symbol interference even under an environment where multipath occurs.

An incoming signal is an OFDM signal including a transmission symbol structured by a valid symbol period and a guard interval, and a predetermined synchronization symbol is included in the OFDM signal for every transmission frame. A correlator calculates how a signal generated by a synchronization symbol generator and the OFDM signal are correlated. A correlation calculator then calculates a correlation therefrom. An integrator integrates the calculated correlation by the guard interval. A timing determination device determines symbol timing from the integrated correlation. An FFT window generator outputs operation timing for Fourier transform from the determined symbol timing. Based on the signal outputted from the FFT window generator, the apparatus for OFDM demodulation extracts a signal in the valid symbol period from the transmission symbol for demodulation.

32 Claims, 16 Drawing Sheets

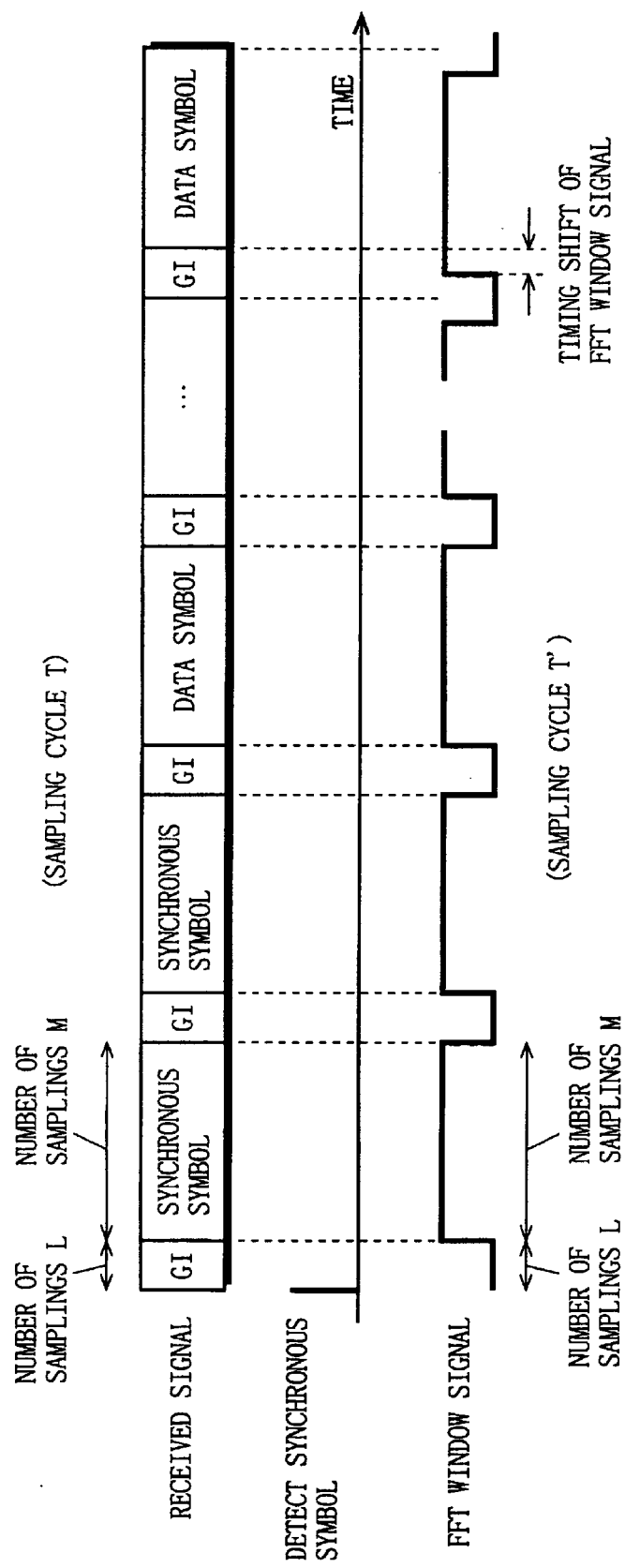
F I G. 1 3

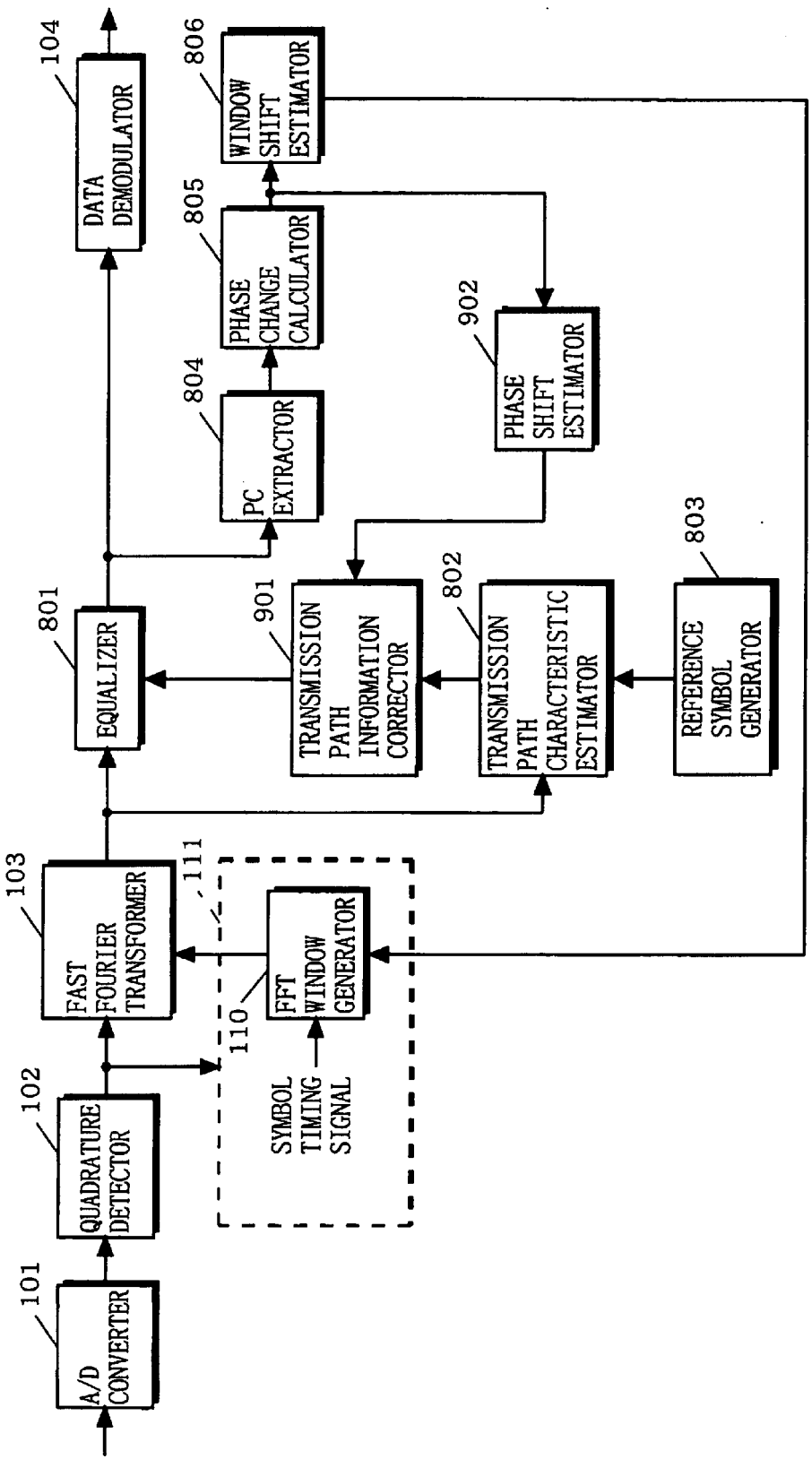
F I G. 14

APPARATUS AND METHOD OF OFDM DEMODULATION

BACKGROUND OF THE INVENTION

1. Field of the Invention

The present invention relates to apparatuses and methods for OFDM demodulation, and more particularly to an apparatus and a method for demodulating a signal transmitted under an orthogonal frequency division multiplex (OFDM) technique.

2. Description of the Background Art

In recent years, a transmission mode applying the OFDM technique has been popular for digital terrestrial television broadcasting, mobile communications, and the like. The OFDM mode is included in a multicarrier modulation scheme, and carries out OFDM signal transmission from a transmitter to a receiver. The transmitter assigns transmission data to a large number of subcarriers having an orthogonality relation between any adjoining two, and the subcarriers are each modulated by the transmission data assigned thereto. Thereafter, the transmitter collectively subjects the modulated subcarriers to inverse Fourier transform to generate an OFDM signal. In such OFDM signal, the transmission data divided and assigned to the subcarriers may be prolonged in cycle, thereby the OFDM signal is characteristically not susceptible to a delay wave, such as multipath.

Such transmission under the OFDM mode is carried out on a transmission symbol basis. The transmission symbol is structured by a valid symbol period and a guard interval (GI). The valid symbol period is a period over which a signal (hereinafter, valid symbol) corresponding to the transmission data is transmitted, and is defined according to the inverse Fourier transform processing. The guard interval is a period over which a signal obtained by partially and cyclically repeating a waveform of the valid symbol is transmitted. The guard interval is for reducing the impact of the delay wave.

The receiver receives the transmission symbol, and extracts the valid symbol therefrom. The receiver then subjects the extracted valid symbol to Fourier transform to separate the valid symbol into the subcarriers. Thereafter, the receiver demodulates each of the separated subcarriers so as to reproduce the transmission data.

The above-described OFDM signal may take such waveform as random noise, therefore it is difficult to establish synchronization in frequency and symbol of the OFDM signal in the receiver. In the case that the OFDM signal is demodulated without frequency synchronization, the orthogonality relation among the subcarriers is lost and thus interference occurs. Further, if the receiver cannot establish symbol synchronization, that is, when the receiver cannot correctly extract the valid symbol from the transmission symbol, interference occurs between the symbols. Accordingly in either case, the receiver fails to correctly reproduce the transmission data.

To get around such problem, in the OFDM signal (see FIG. 16) for transmission under the OFDM mode, a symbol (hereinafter, synchronous symbol) being a reference to synchronization is provided at the head of a transmission frame. The transmission frame is structured by several predetermined transmission symbols.

The conventional OFDM receiver which establishes symbol synchronization by using such synchronous symbol is found in Japanese Patent Laying-Open No. 11-32025 (99-32025) titled "OFDM receiver and method for detecting synchronization therein". The conventional technique applies a chirp symbol to the synchronous symbol. By calculating a correlation coefficient between the chirp symbol and a received signal, the conventional receiver detects symbol timing from a maximum value thereof, and establishes symbol synchronization therein.

In the case that the multipath occurs due to a transmission path characteristic, as shown in FIGS. 17A and 17B, the receiver may receive both a direct wave and a delay wave of a transmitting signal, i.e., a combined wave thereof. Herein, when a delay of the delay wave is within the guard interval, the receiver can extract the valid symbol located in a section having no adjacent-symbol interference (FIG. 17A) by following the timing of the valid symbol period of the direct wave. However, this is not applicable to a case where the delay of the delay wave is beyond the guard interval. It may result in extracting the valid symbol having been influenced by the adjacent-symbol interference (FIG. 17B). Therefore, if the adjacent-symbol interference occurs in the receiver, there is a need for setting a section from which the valid symbol is extracted so as to minimize the interference. Note that, the diagonally shaded area in FIGS. 17A and 17B shows a part where the adjacent-symbol interference is observed.

In the conventional receiver, however, the symbol timing is set according to the maximum value of the correlation coefficient between the received signal and the synchronous symbol. Consequently, when the delay of the delay wave is beyond the guard interval, the conventional receiver is incapable of setting the symbol timing in such a manner as to minimize the adjacent-symbol interference.

Further, in the case that the transmitting signal and the received signal have a shift in frequency (hereinafter, frequency shift) therebetween, the correlation coefficient between the received signal and the synchronous symbol becomes smaller. Consequently, the conventional receiver cannot satisfactorily detect the synchronous symbol therein.

Still further, a sampling frequency for sampling symbols may be shifted (hereinafter, sampling frequency shift) between the transmitter and the receiver. If this is the case, the symbol timing setting based on detection of the synchronous symbol as the conventional receiver is not sufficient. It leads to a shift of the symbol timing, i.e., a shift of the valid symbol period between the transmission symbols at the head and at the tail in the transmission frame.

SUMMARY OF THE INVENTION

Therefore, a first object of the present invention is to provide an apparatus for OFDM demodulation capable of setting symbol timing in such a manner as to minimize adjacent-symbol interference even if a transmission path characteristic varies with time, and a method therefor.

A second object of the present invention is to provide an apparatus for OFDM demodulation correcting a frequency shift, if any, for satisfactory synchronous symbol detection, and a method therefor.

A third object of the present invention is to provide an apparatus for OFDM demodulation, if a sampling frequency shift is observed, correcting the symbol timing so as not to cause a shift among valid symbol periods by the location of transmission symbols in a transmission frame, and a method therefor.

A fourth object of the present invention is to provide an apparatus for OFDM demodulation, even if the shift is observed among the valid symbol periods by the location of the transmission symbols in the transmission frame, correcting the symbol timing according to information about a transmission path characteristic estimated from a predetermined reference symbol.

The present invention has the following features to attain the above objects.

A first aspect of the present invention is directed to an OFDM demodulation apparatus for demodulating an OFDM signal which includes a data symbol structured by a valid symbol period and a guard interval, and a specific synchronous symbol is included in the OFDM signal for every transmission frame, the apparatus comprising:

an impulse response estimation part for estimating an impulse response from the OFDM signal;

an integration part for integrating a signal obtained by estimation in the impulse response estimation part;

a determination part for detecting symbol timing of the OFDM signal based on a value obtained by integration in the integration part;

a window timing generation part for generating, according to the symbol timing, window timing to provide the valid symbol period; and a Fourier transformation part for subjecting the OFDM signal to Fourier transform according to the window timing.

As described above, in the first aspect, timing of a synchronous symbol of an incoming OFDM signal is detected so as to control window timing for Fourier transform based thereon. In this manner, in the first aspect, the OFDM signal can be demodulated, i.e., the transmission data can be reproduced with between-symbol interference minimized even if a transmission path characteristic varies with time.

According to a second aspect, in the first aspect, when an identical waveform is periodically transmitted in the synchronous symbol at least twice, the apparatus further comprises:

a delay part for delaying the OFDM signal for a predetermined number of samplings;

a multiplication part for multiplying a signal obtained by delay in the delay part and the OFDM signal;

an averaging part for averaging a signal obtained by multiplication in the multiplication part;

a frequency error calculation part for calculating a frequency error based on a signal obtained by averaging in the averaging part;

a hold part for holding the frequency error according to the symbol timing; and a frequency correction part for correcting a frequency shift of the OFDM signal according to the frequency error provided by the hold part, wherein the Fourier transformation part subjects, to Fourier transform, the OFDM signal with frequency shift corrected by the frequency correction part according to the window timing.

As described above, in the second aspect, in addition to the control described in the first aspect, an average phase shift among the received synchronous symbols is first calculated, secondly a frequency error is calculated therefrom, and then a frequency shift of the OFDM signal is corrected. In this manner, in addition to the effects achieved in the first aspect, the symbols can be demodulated under frequency synchronization by first correcting the frequency shift with the synchronous symbol used for symbol synchronization, and by Fourier-transforming the frequency-shift-corrected OFDM signal with the symbol timing.

According to a third aspect, in the first aspect, when an identical waveform is periodically transmitted in the synchronous symbol at least twice, the apparatus further comprising:

a first delay part for delaying the OFDM signal (hereinafter, first OFDM signal) for a first predetermined number of samplings;

a first multiplication part for multiplying a signal obtained by delay in the first delay part and the first OFDM signal;

a first averaging part for averaging a signal obtained by multiplication in the first multiplication part;

a first frequency error calculation part for calculating a first frequency error based on a signal obtained by averaging in the first averaging part;

a filter part for smoothing a signal obtained by multiplication in the first multiplication part;

an absolute value calculation part for calculating an absolute value of a signal obtained by smoothing in the filter part;

a first determination part for determining, according to the absolute value, a correlation between the first OFDM signal and the signal obtained by delay in the first delay part, and detecting symbol timing of the first OFDM signal;

a first hold part for holding the first frequency error according to the symbol timing detected by the first determination part;

a first frequency correction part for correcting a frequency shift of the first OFDM signal according to the first frequency error provided by the first hold part;

a second delay part for delaying, for a second predetermined number of samplings, the first OFDM signal with frequency shift corrected by the first frequency correction part (hereinafter, second OFDM signal);

a second multiplication part for multiplying a signal obtained by delay in the second delay part and the second OFDM signal;

a second averaging part for averaging a signal obtained by multiplication in the second multiplication part;

a second frequency error calculation part for calculating a second frequency error based on a signal obtained by averaging in the second averaging part;

a second hold part for holding the second frequency error according to the symbol timing detected by the determination part; and a second frequency correction part for correcting a frequency error of the second OFDM signal according to the second frequency error provided by the second hold part, wherein the impulse response estimation part estimates the impulse response from the second OFDM signal, and the Fourier transformation part subjects, to Fourier transform, the second OFDM signal with frequency shift corrected by the second frequency conversion part according to the window timing.

As described above, in the third aspect, in addition to the control in the first aspect, frequency error correction is carried out in the first frequency corrector before calculating a correlation between the OFDM signal and the synchronous symbol signal. In this manner, accuracy in detecting the synchronous symbol can be further improved. This is because a frequency-corrected signal is used for symbol synchronization and further frequency correction for the second time.

Herein, as in a fourth aspect, it is preferable that the integration part in the first aspect regard a time length of the guard interval as an integration section, and integrates an incoming signal while sequentially shifting the location of the integration section with respect to the incoming signal.

Alternatively, as in a fifth aspect, the integration part in the first aspect may regard a time length of the guard interval and a predetermined time length before and after the guard interval as an integration section. The integration part then integrates an incoming signal while sequentially shifting the location of the integration section with respect to the incoming signal, and responds before and after a rectangular impulse response in the time length of the guard interval.

Alternatively, as in a sixth aspect, the integration part in the first aspect may regard a time length of the guard interval and a predetermined time length before and after the guard interval as an integration section. The integration part then integrates an incoming signal while sequentially shifting the location of the integration section with respect to the incoming signal, and responds monotonously increasing before a rectangular impulse response in the time length of the guard intervals but monotonously decreasing thereafter.

Preferably, as in a seventh aspect, the impulse response estimation part in the first aspect comprises:
  a synchronous symbol generation part for generating a signal identical to the synchronous symbol;
  a correlation part for calculating a signal indicating a correlation how the signal generated by the synchronous symbol generation part and the OFDM signal are correlated to each other; and
  a correlation calculation part for calculating a correlation from the signal obtained by calculation in the correlation part.

Alternatively, as in an eighth aspect, the impulse response estimation part in the first aspect comprises:
  a synchronous symbol generation part for generating a signal whose frequency domain is identical to the synchronous symbol;
  a multiplication part for multiplying a signal provided by the Fourier transformation part and the signal provided by the synchronous symbol generation part;
  an inverse Fourier transformation part for subjecting, to inverse Fourier transform, a signal obtained by multiplication in the multiplication part; and
  a correlation calculation part for calculating a correlation from a signal provided by the inverse Fourier transformation part.

It is more preferable, as in ninth and tenth aspects, that the correlation calculation part in the seventh and eighth aspects calculates an absolute value of a complex vector (i, q) of the incoming signal.

Alternatively, as in eleventh and twelfth aspects, the correlation calculation part in the seventh and eighth aspects calculates a sum of an absolute value of i and an absolute value of q from the complex vector (i, q) of the incoming signal.

Alternatively, as in thirteenth and fourteenth aspects, the correlation calculation part in the seventh and eighth aspects calculates a sum of a square of i and a square of q from the complex vector (i, q) of the incoming signal.

More preferably, as in a fifteenth aspect, the first determination part in the third aspect receives the absolute value calculated by the absolute value calculation part, detects a value for invariability thereof, and then detects the absolute value showing a predetermined proportion to the invariable value.

As described above, in the fourth to fifteenth aspects, the timing of the valid symbol period is controlled for Fourier transform to be so carried out as to minimize the between-symbol interference. This is done by first calculating a correlation between the OFDM signal and the prestored synchronous symbol signal, secondly integrating the correlation by a predetermined integral section width, and lastly, based on the integrated correlation obtained thereby, detecting the synchronous symbol. In this manner, the OFDM signal can be demodulated, i.e., the transmission data can be reproduced with the between-symbol interference minimized even if a transmission path characteristic varies with time.

A sixteenth aspect of the present invention is directed to an OFDM demodulation apparatus for demodulating an OFDM signal in which a known pilot carrier being a reference phase is assigned to each of a plurality of predetermined subcarriers, the apparatus comprising:
  a Fourier transformation part for subjecting the OFDM signal to Fourier transform;
  a pilot carrier extraction part for extracting the pilot carriers from a signal obtained by Fourier transform in the Fourier transformation part;
  a phase change calculation part for calculating a phase change of the extracted pilot carriers;
  a window shift estimation part for estimating, according to the phase change, a shift of window timing indicating timing for operation of the Fourier transformation part; and
  a window timing generation part for generating, according to the shift estimated in the window shift estimation part and symbol timing of the OFDM signal, the window timing which causes the Fourier transformation part to operate.

As described above, in the sixteenth aspect, pilot carriers are extracted from the Fourier-transformed signal, and based on a phase change of the pilot carriers, a shift of the window timing at the time of Fourier transform is estimated and then corrected. In this manner, symbols can be demodulated under symbol synchronization even if a sampling frequency shift is observed.

A seventeenth aspect of the present invention is directed to an OFDM demodulation apparatus for demodulating an OFDM signal in which every transmission frame is provided with a predetermined reference symbol, and a known pilot carrier being a reference phase is assigned to each of a plurality of predetermined subcarriers, the apparatus comprising:
  a Fourier transformation part for subjecting the OFDM signal to Fourier transform;
  a reference symbol generation part for generating a signal identical to the reference symbol;
  a transmission path characteristic estimation part for estimating a transmission path characteristic based on the signal generated by the reference symbol generation part and a Fourier-transformed signal in the Fourier transformation part;
  an equalization part for equalizing the Fourier-transformed signal according to information about the transmission path characteristic provided by the transmission path characteristic estimation part;
  a pilot carrier extraction part for extracting the pilot carriers from a signal obtained by equalization in the equalization part;
  a phase change calculation part for calculating a phase change of the extracted pilot carriers;

a window shift estimation part for estimating, according to the phase change, a shift of window timing indicating timing for operation of the Fourier transformation part; and a window timing generation part for generating, according to the shift estimated in the window shift estimation part and symbol timing of the OFDM signal, the window timing which causes the Fourier transformation part to operate.

As described above, in the seventeenth aspect, the information about transmission path characteristic is estimated from a received reference symbol, and then the OFDM signal is equalized according thereto. Further, pilot carriers are extracted from the equalized signal, and based on a phase change of the pilot carriers, a shift of the window timing at the time of Fourier transform is estimated and then adjusted. In this manner, symbols can be demodulated under symbol synchronization even if a sampling frequency shift is observed.

According to an eighteenth aspect, in the seventeenth aspect, the OFDM demodulation apparatus further comprises:

a phase shift estimation part for estimating a phase shift of the OFDM signal according to the phase change; and a transmission path information correction part for correcting, according to the phase shift, the information about the transmission path characteristic to be outputted from the transmission estimation part to the equalization part.

As described above, in the eighteenth aspect, a phase change is estimated from the phase shift occurred in the symbols, and then the information about the transmission path characteristic is corrected based thereon. Accordingly, it is possible to correct a shift, due to the sampling frequency shift, between window timing at the time of Fourier transform for a reference symbol used to estimate the information about the transmission path characteristic and window timing at the time of Fourier transform for the OFDM signal before equalization. In this manner, accuracy in equalizing the signal is improved.

Herein, preferably, as in a nineteenth aspect, the transmission path information correction part in the eighteenth aspect corrects the information about the transmission path characteristic according to timing when a signal indicating the phase shift is provided by the window shift estimation part.

Alternatively, as in a twentieth aspect, the window timing generation part in the seventeenth aspect generates, according to the shift estimated in the window shift estimation part, the window timing while shifting the symbol timing for a predetermined number of samplings.

More preferably, as in a twenty-first aspect, in the seventeenth aspect, the OFDM demodulation apparatus further comprises:

a phase shift estimation part for estimating a phase shift of the OFDM signal according to the phase change; and a phase correction part for correcting a phase of the signal provided by the equalization part based on the phase shift.

A twenty-second aspect of the present invention is directed to an OFDM demodulation method for demodulating an OFDM signal which includes a data symbol structured by a valid symbol period and a guard interval, and a specific synchronous symbol is included in the OFDM signal for every transmission frame, the method comprising the steps of:

estimating an impulse response from the OFDM signal;

integrating a signal obtained by estimation;

detecting symbol timing of the OFDM signal based on a value obtained by integration in the integration part;

generating window timing to provide the valid symbol period based on the symbol timing; and Fourier-transforming the OFDM signal according to the window timing.

According to a twenty-third aspect, in the twenty-second aspect, when an identical waveform is periodically transmitted in the synchronous symbol at least twice or more, the method further comprising the steps of:

delaying the OFDM signal for a predetermined number of samplings;

multiplying a signal obtained by delay in the delay part and the OFDM signal;

averaging a signal obtained by multiplication in the multiplication part;

calculating a frequency error based on a signal obtained by averaging in the averaging part;

holding the frequency error according to the symbol timing; and correcting a frequency shift of the OFDM signal according to the frequency error provided in the holding step, wherein in the Fourier-transform step, the OFDM signal with frequency shift corrected is subjected to Fourier transform according to the window timing.

According to a twenty-fourth aspect, in the twenty-second aspect, when an identical waveform is periodically transmitted in the synchronous symbol at least twice, the method further comprising:

a first delay step of delaying the OFDM signal (hereinafter, first OFDM signal) for a first predetermined number of samplings;

a first multiplication step of multiplying a signal obtained by delay in the first delay step and the first OFDM signal;

a first averaging step of averaging a signal obtained by multiplication in the first multiplication step;

a step of calculating a first frequency error based on a signal obtained by averaging in the first averaging step;

a step of smoothing a signal obtained by multiplication in the first multiplication step;

a step of calculating an absolute value of a signal obtained by smoothing in smoothing step;

a first determination step of determining, according to the absolute value, a correlation between the first OFDM signal and the signal obtained by delay in the first delay step, and detecting symbol timing of the first OFDM signal;

a step of holding the first frequency error according to the symbol timing detected in the first determination step;

a step of correcting a frequency shift of the first OFDM signal according to the first frequency error held;

a second delay step of delaying, for a second predetermined number of samplings, the first OFDM signal with frequency shift corrected (hereinafter, second OFDM signal);

a second multiplication step of multiplying a signal obtained by delay in the second delay step and the second OFDM signal;

a second averaging step of averaging a signal obtained by
multiplication in the second multiplication step;

a step of calculating a second frequency error based on a
signal obtained by averaging in the second averaging
step;

a step of holding the second frequency error according to
the symbol timing detected in the determination step;
and a step of correcting a frequency shift of the second OFDM
signal according to the second frequency error held,
wherein in the estimating step, an impulse response is estimated
from the second OFDM signal, and in the Fourier-transform step, according to the window
timing, the second OFDM signal with frequency shift
corrected is subjected to Fourier transform.

Herein, preferably, as in a twenty-fifth aspect, in the
integrating step in the twenty-second aspect, a time length of
the guard interval is regarded as an integration section, and
an incoming signal is integrated while the location of the
integration section being sequentially shifted with respect to
the incoming signal.

Alternatively, as in a twenty-sixth aspect, in the integrating
step in the twenty-second aspect, a time length of the
guard interval and a predetermined time length before and
after the guard interval are regarded as an integration
section, and by integrating an incoming signal while sequentially
shifting the location of the integration section with
respect to the incoming signal, a response is provided before
and after a rectangular impulse response having the time
length of the guard interval.

Alternatively, as in a twenty-seventh aspect, in the integrating
step in the twenty-second aspect, a time length of the
guard interval and a predetermined time length before and
after the guard interval are regarded as an integration
section, and by integrating an incoming signal while sequentially
shifting the location of the integration section with
respect to the incoming signal, a response monotonously
increasing before a rectangular impulse response having the
time length of the guard interval, but monotonously decreasing
thereafter is provided.

Preferably, as in a twenty-eighth aspect, the estimating
step in the twenty-second aspect comprises the steps of:

generating a signal identical to the synchronous symbol;

calculating a signal indicating a correlation between a
signal generated in the generating step and the OFDM
signal; and calculating a correlation from a signal obtained in the
calculating step.

According to a twenty-ninth aspect, in the twenty-second
aspect, the estimating step comprises the steps of:

generating a frequency-domain signal identical to the
synchronous symbol;

multiplying a signal obtained in the Fourier-transform
step and the frequency-domain signal generated in the
generating step;

inverse-Fourier-transforming a signal obtained in the multiplying
step; and calculating a correlation from the inverse-Fourier-
transformed signal.

Preferably, as in thirtieth and thirty-first aspects, in the
calculating step in the twenty-eighth and twenty-ninth
aspects, an absolute value of a complex vector (i, q) of the
incoming signal is calculated.

Alternatively, as in thirty-second and thirty-third aspects,
in the calculating step in the twenty-eighth and twenty-ninth
aspects, a sum of an absolute value of i and an absolute value
of q is calculated from the complex vector (i, q) of the
incoming signal.

Alternatively, as in thirty-fourth and thirty-fifth aspects, in
the calculating step in the twenty-eighth and twenty-ninth
aspects, a sum of a square of i and a square of q is calculated
from the complex vector (i, q) of the incoming signal.

More preferably, as in a thirty-sixth aspect, in the first
determination step in the twenty-fourth aspect, a value for
invariability of the absolute value is detected, and then the
absolute value showing a predetermined proportion to the
invariable value is detected.

A thirty-seventh aspect of the present invention is directed
to an OFDM demodulation method for demodulating an
OFDM signal in which a known pilot carrier being a
reference phase is assigned to each of a plurality of predetermined
subcarriers, the method comprising the steps of:

Fourier-transforming the OFDM signal;

extracting the pilot carriers from the Fourier-transformed
signal;

calculating a phase change of the extracted pilot carriers;

estimating, according to the phase change, a shift of
window timing indicating timing for Fourier transform;
and generating, according to the estimated shift and symbol
timing of the OFDM signal, the window timing for
Fourier transform with respect to the OFDM signal.

A thirty-eighth aspect of the present invention is directed
to an OFDM demodulation method for demodulating an
OFDM signal in which every transmission frame is provided
with a predetermined reference symbol, and a known pilot
carrier being a reference phase is assigned to each of a
plurality of predetermined subcarriers, the method comprising
the steps of:

Fourier-transforming the OFDM signal;

generating a signal identical to the reference symbol;

estimating a transmission path characteristic based on the
generated signal and the Fourier-transformed signal;

equalizing the Fourier-transformed signal according to
information about the transmission path characteristic
obtained in the estimating step;

extracting the pilot carriers from the equalized signal;

calculating a phase change of the extracted pilot carriers;

estimating, according to the phase change, a shift of
window timing indicating timing for Fourier transform;
and generating, according to the estimated shift and symbol
timing of the OFDM signal, the window timing for
Fourier transform with respect to the OFDM signal.

According to a thirty-ninth aspect, in the thirty-eighth
aspect, the method further comprises the steps of:

estimating a phase shift of the OFDM signal according to
the phase change; and correcting the information about transmission path characteristic
according to the phase shift.

Herein, preferably, as in a fortieth aspect, in the correcting
step in the thirty-ninth aspect, the information about the
transmission path characteristic is corrected according to
timing when a signal indicating the phase shift is provided
after being estimated in the estimating step.

Preferably, as in a forty-first aspect, in the window-
timing-generating step in the thirty-eighth aspect, the window
timing is generated while shifting the symbol timing for
a predetermined number of timings according to the estimated
shift.

More preferably, according to a forty-second aspect, in the thirty-eighth aspect, the method further comprises the steps of:

estimating a phase shift of the OFDM signal according to the phase change; and correcting a phase of a signal provided after equalization in the equalizing step based on the phase shift.

These and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a diagram for explaining how timing of an FFT window signal is shifted by a sampling frequency shift;

FIG. 14 is a block diagram showing the structure of an apparatus for OFDM demodulation according to a fifth embodiment of the present invention;

DESCRIPTION OF THE PREFERRED EMBODIMENTS (First Embodiment)

By referring to FIGS. 1 to 7, an apparatus and a method for OFDM demodulation are described according to a first embodiment of the present invention.

Figure 1:
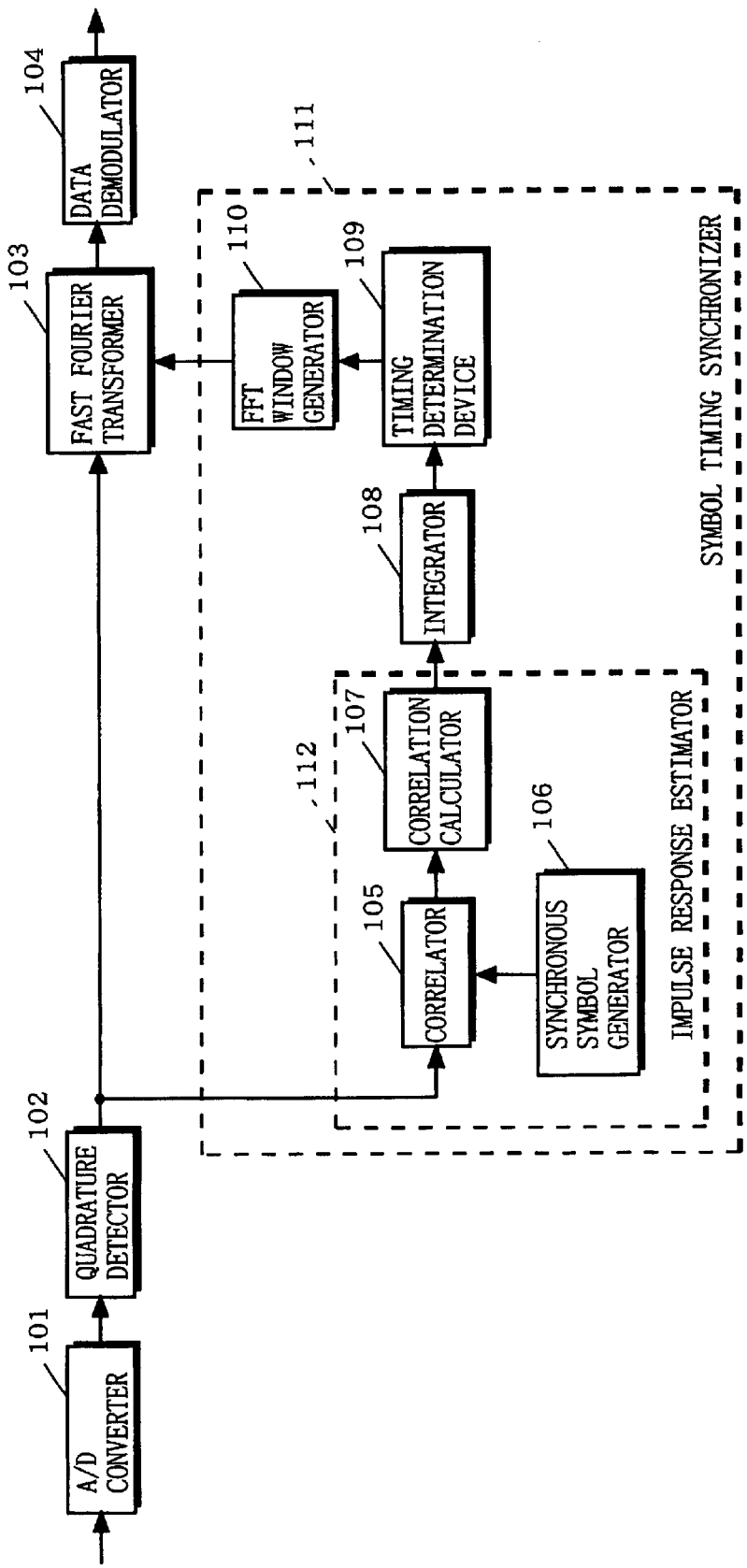
FIG. 1 is a block diagram showing the structure of an apparatus for OFDM demodulation according to a first embodiment of the present invention.

FIG. 1 is a block diagram showing the structure of the apparatus for OFDM demodulation of the first embodiment.

In FIG. 1, the apparatus is provided with an A/D converter 101, an quadrature detector 102, a fast Fourier transformer 103, a data demodulator 104, and a symbol timing synchronizer 111. The symbol timing synchronizer 111 includes an impulse response estimator 112, an integrator 108, a timing determination device 109, and an FFT window generator 110. The impulse response estimator 112 includes a correlator 105, a synchronous symbol generator 106, and a correlation calculator 107.

First, it is described how the apparatus for OFDM demodulation of the first embodiment operates on a constituent basis.

Figure 16:
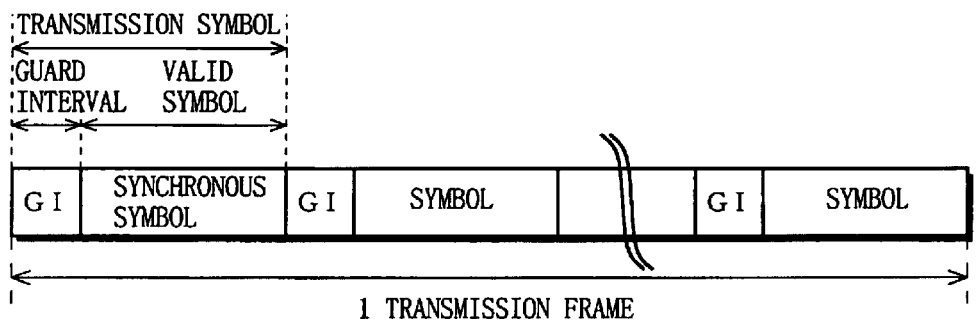
FIG. 16 is a diagram for explaining the structure of a transmission frame applied in OFDM transmission.
Figure 17A:
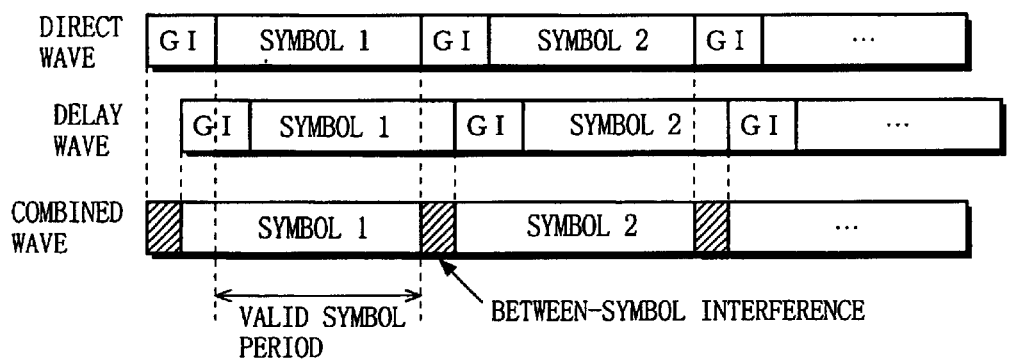
FIGS. 17A and 17B are diagrams each for explaining a signal received by a receiver when multipath occurs.
Figure 17B:
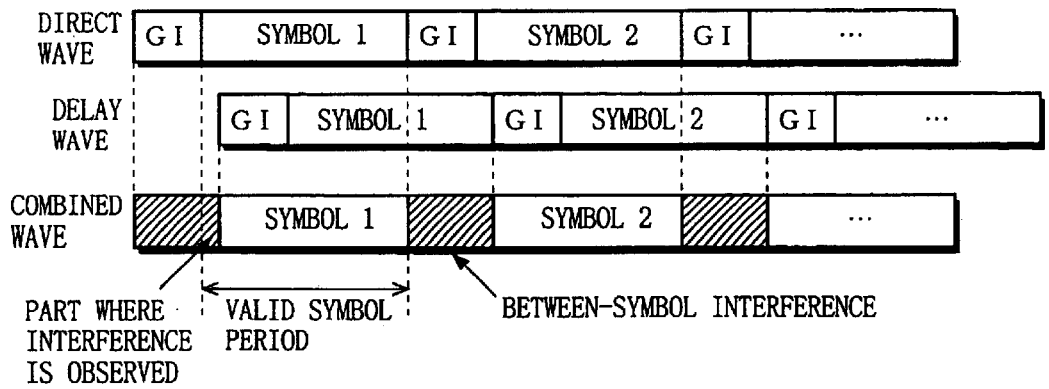

An OFDM signal transmitted from a transmitter (not shown) is received by a tuner (not shown), and then is converted into an intermediate frequency signal arbitrarily selected by the tuner. The OFDM signal herein is similar to the one shown in FIG. 16. Herein, for the synchronous symbol, a chirp signal taking a strong autocorrelation, a signal in which a predetermined subcarrier is assigned a predetermined vector, or a signal taking an identical waveform periodically repeated at least twice in the symbol period may be used. Herein, the synchronous symbol may be provided at the head of the respective transmission frames, or plurally provided in one transmission frame (e.g., inserted at a given interval). An advantage of a plurality of synchronous symbols is that synchronization can be established every time the synchronous symbol is detected. Accordingly, demodulation can be carried out with higher accuracy.

The OFDM signal converted into an intermediate frequency band signal is forwarded to the A/D converter 101. The A/D converter 101 converts the received OFDM signal into a time-series digital signal. The quadrature detector 102 receives the digital signal from the A/D converter 101, and performs orthogonality detection thereon so as to convert the signal into a baseband signal. The baseband signal is forwarded to both the fast Fourier transformer 103 and the symbol timing synchronizer 111. The symbol timing synchronizer 111 detects symbol timing of the baseband signal, and then based on a result obtained thereby, provides the fast Fourier transformer 103 with a period during which a valid symbol is extracted (valid symbol period). According to the valid symbol period provided by the symbol timing synchronizer 111, the fast Fourier transformer 103 extracts the valid symbol from each of the transmission symbols included in the baseband signal. Thereafter, the fast Fourier transformer 103 subjects the extracted valid symbols to Fourier transform so as to separate the baseband signal into subcarriers. The data demodulator 104 demodulates the signal separated into the subcarriers in the fast Fourier transformer 103 so as to reproduce the transmission data.

Next, it is described in detail how the symbol timing synchronizer 111 operates.

The baseband signal converted in the quadrature detector 102 is forwarded to the correlator 105. The synchronous symbol generator 106 generates a synchronous symbol signal whose waveform is identical to that of the synchronous symbol inserted into the transmission frame on the transmitter side. Such synchronous symbol generator 106 is implemented by a memory circuit, for example. In detail, the memory circuit is previously stored with a signal whose waveform is identical to that of the synchronous symbol inserted into the transmission frame on the transmitter side, whereby the synchronous symbol signal can be generated by reading out the stored signal. The correlator 105 receives both the baseband signal outputted from the quadrature detector 102 and the synchronous symbol signal generated by the synchronous symbol generator 106. The correlator 105 then performs product-sum operation on the baseband signal and the synchronous symbol signal, and thus obtains a correlation vector.

In a case that one transmission frame has several synchronous symbols inserted at a predetermined interval, it is possible to carry out such processing as described next below. The symbol timing synchronizer 111 predicts the location of the next synchronous symbol based on the timing of the detected synchronous symbol. Thereafter, the symbol timing synchronizer 111 causes the correlator 105 to operate only for a given period before and after the predicted location, and thus obtains the correlation vector.

Figure 2:
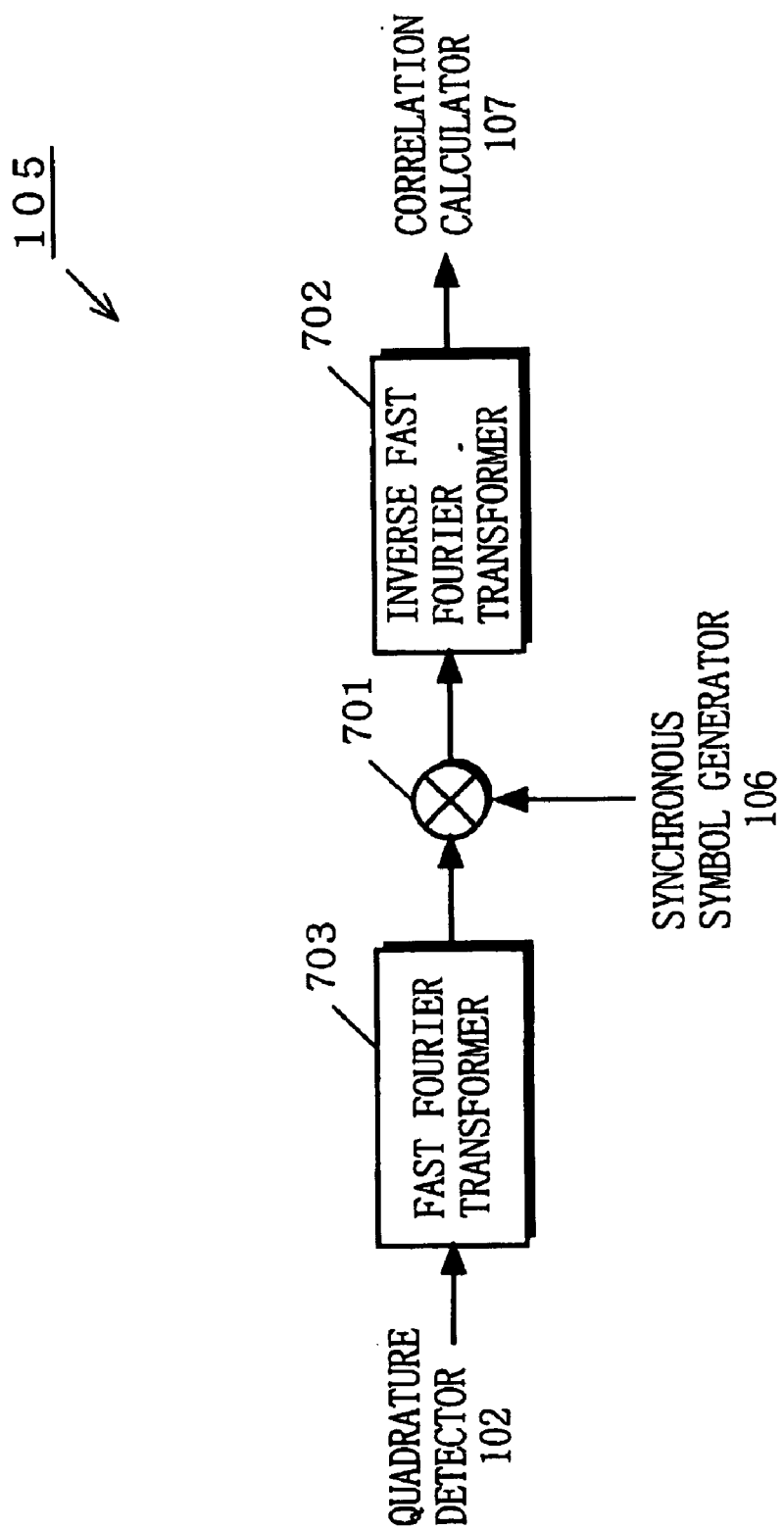
FIG. 2 is a block diagram showing an exemplary structure of a correlator 105 in detail.

Herein, the correlator 105 may take the structure shown in FIG. 2. In FIG. 2, the correlator 105 includes a fast Fourier transformer 703, a multiplier 701, and an inverse fast Fourier transformer 702. The baseband signal provided by the quadrature detector 102 is converted into a frequency-domain signal by the fast Fourier transformer 703. The multiplier 701 multiplies the frequency-domain signal provided by the fast Fourier converter 703 and the frequency-domain synchronous symbol signal generated by the synchronous symbol generator 106 together. The signal obtained by the multiplication in the multiplier 701 is subjected to inverse Fourier transform in the inverse fast Fourier transformer 702. The inverse Fourier-transformed signal is equivalent to the correlation vector between the baseband signal and the synchronous symbol signal.

Note that, circuits of the inverse fast Fourier transformer 702 and the fast Fourier converter 703 can share the same structure. Accordingly, the fast Fourier transformer 703 may be used as an alternative to the inverse fast Fourier transformer 702 to subject the signal provided by the multiplier 701 to inverse Fourier transform. It is also possible to make the fast Fourier converter 703 and the fast Fourier converter 103 sharable with each other, and the signal coming from the fast Fourier transformer 103 is forwarded to the multiplier 701. With such structure, the symbol timing synchronizer 111 can be reduced in circuit size.

Figure 3:
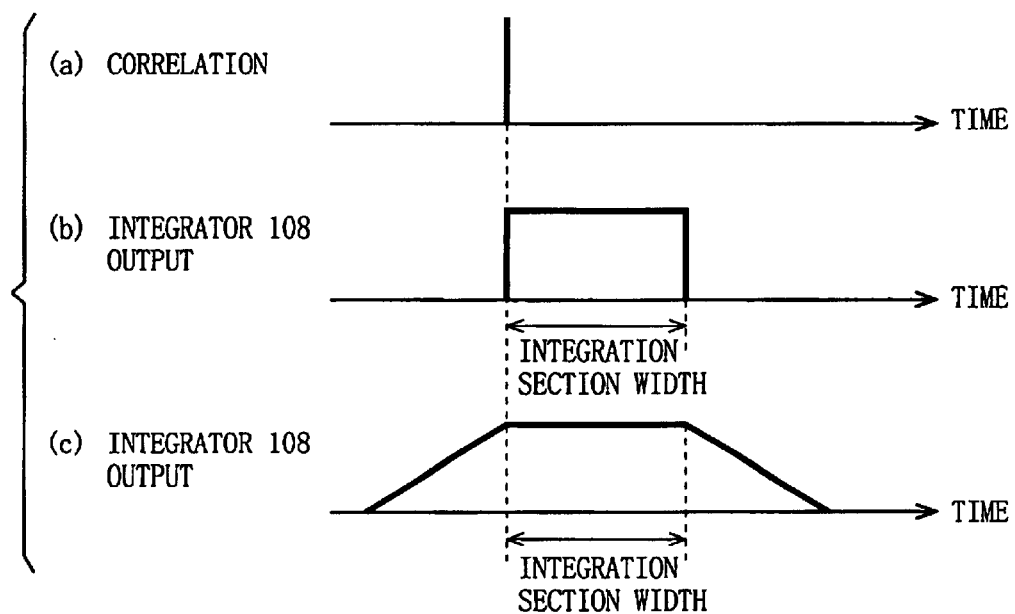
FIG. 3 is a diagram for explaining the operation of an integrator 108.

The correlation calculator 107 receives the correlation vector obtained by the correlator 105, and then calculates the magnitude (correlation) thereof. If the correlation vector is supposedly indicated by (i, q), the correlation may be a sum of the square of i and that of q, an absolute value of the correlation vector as an approximate value, or a sum of an absolute value of i and that of q. The integrator 108 receives the correlation calculated by the correlation calculator 107, and then integrates the correlation. At this time, the integrator 108 regards a time length of the guard interval as an integral section width, and performs integration on an incoming signal (correlation) while sequentially shifting the integral section width. FIG. 3 shows an exemplary signal provided by the correlator 108. When received an impulse-like correlation as shown in (a) of FIG. 3, the integrator 108 performs integration thereon while sequentially shifting a given integral section width, and accordingly outputs a rectangular signal having an integral section width as shown in (b) of FIG. 3. Note that, although the integration technique applied to the integrator 108 of this embodiment is the one for outputting a rectangular response in an integral section width, it is not restrictive. Another possibility may be an integration technique for additionally responding before and after the rectangular response in the integral section width, or as shown in (c) of FIG. 3, an integration technique for having a response monotonously increasing before the rectangular responses but a response monotonously decreasing thereafter.

The correlation integrated by the integrator 108 (hereinafter, integrated correlation) is forwarded to the timing determination device 109. Based on the integrated correlation, the timing determination device 109 determines starting (or ending) timing of the synchronous symbol. Such determination is made by detecting timing when the integrated correlation becomes maximum. The starting (or ending) timing determined by the timing determination device 109 is outputted to the FFT window generator 110. Based on the starting (or ending) timing, the FFT window generator 110 generates an FFT window signal, which provides the valid symbol period in each transmission symbol to the fast Fourier transformer 103. Herein, a time length of the transmission symbol included in the transmission frame, i.e., a time length of the guard interval and that of the valid symbol are both known. Therefore, with the starting (or ending) timing of the synchronous symbol in the received signal detected by the timing determination device 109, the FFT window generator 110 can accordingly detect a head of the transmission symbols based thereon. In this manner, an FFT window signal to be generated thereby can be equivalent to the valid symbol period.

Next, it is described in detail how the symbol timing synchronizer 111 operates with reference to FIGS. 4 to 7.

Figure 4:
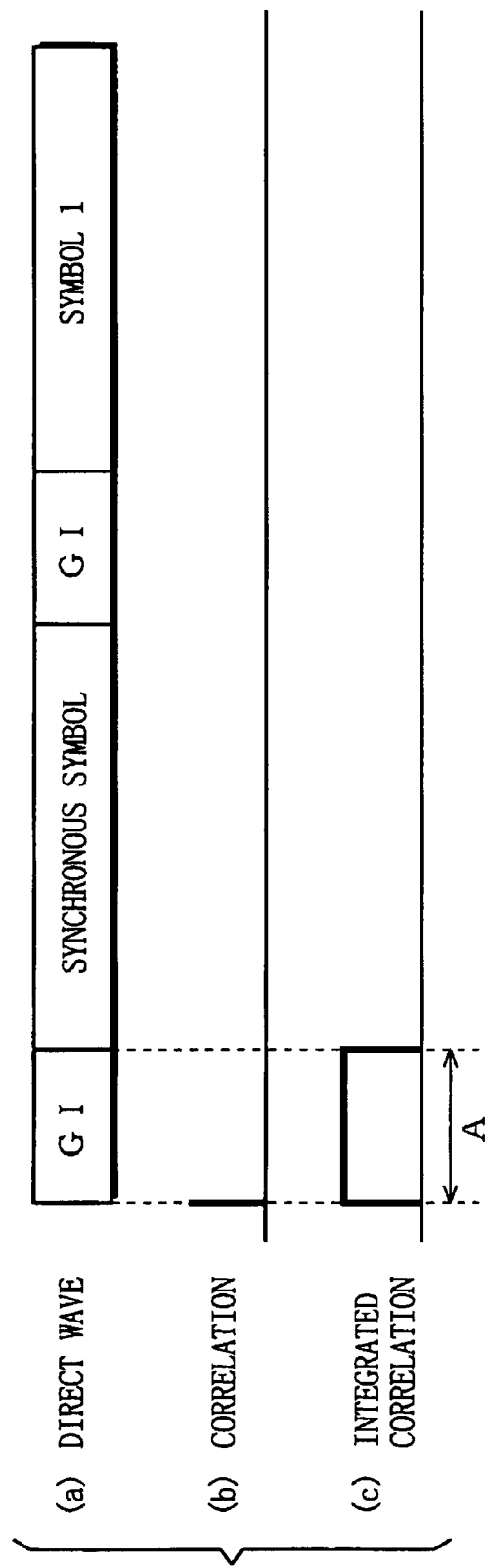
FIG. 4 is a diagram for explaining an exemplary operation of an impulse response estimator 112.

FIG. 4 shows a correlation and an integrated correlation in a case that only a direct wave ((a) of FIG. 4) (without a delay wave) is provided to the apparatus for OFDM demodulation.

In this case, as shown in (b) of FIG. 4, the correlation between the direct wave and the synchronous symbol signal calculated by the correlation calculator 107 appears at the head of the direct wave. If the correlation is integrated by the integral section width which is the time length of the guard interval in the integrator 108, the integrated correlation obtained thereby is rectangular as shown in (c) of FIG. 4. Accordingly, by setting, to the symbol timing, arbitrary timing within the interval A where the integrated correlation is maximum in the timing determination device 109, the apparatus for OFDM demodulation can successfully reproduce the transmission data without causing the between-symbol interference. Herein, timing at the tail of the interval A is preferably set to the symbol timing.

Figure 5:
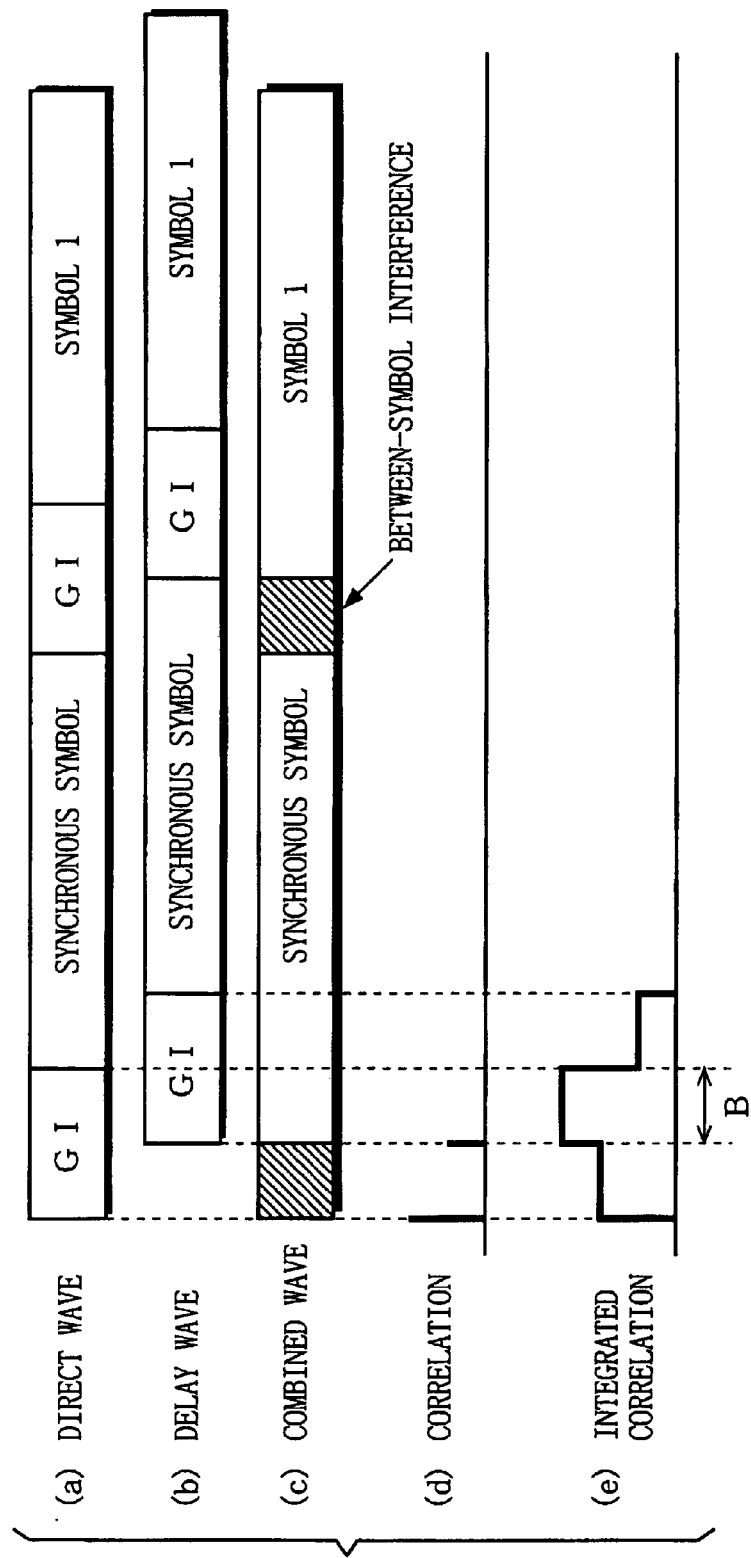
FIG. 5 is a diagram for explaining an exemplary operation of the impulse response estimator 112.

FIG. 5 shows a correlation and an integrated correlation in a case that a combined wave ((c) of FIG. 5) of a direct wave ((a) thereof) and a delay wave ((b) thereof) is provided to the apparatus for OFDM demodulation due to multipath. FIG. 5 exemplarily shows a case that a delay of the delay wave is within the guard interval, and a power level thereof is "direct wave>delay wave". In FIG. 5, the diagonally shaded area is a part where the between-symbol interference is observed.

In this case, as shown in (d) of FIG. 5, the correlation between the combined wave and the synchronous symbol signal calculated by the correlation calculator 107 appears twice, at the head of the direct wave and at the head of the delay wave, and each is proportional to the power level thereof. If the correlation is integrated by the integral section width which is the time length of the guard interval in the integrator 108, the integrated correlation obtained thereby is as shown in (e) of FIG. 5. Therein, the interval B is the maximum. Accordingly, by setting, to the symbol timing, arbitrary timing within the interval B where the integrated correlation is maximum in the timing determination device 109, the apparatus for OFDM demodulation can successfully reproduce the transmission data without causing the between-symbol interference. Herein, timing at the tail of the interval B is preferably set to the symbol timing.

Figure 6:
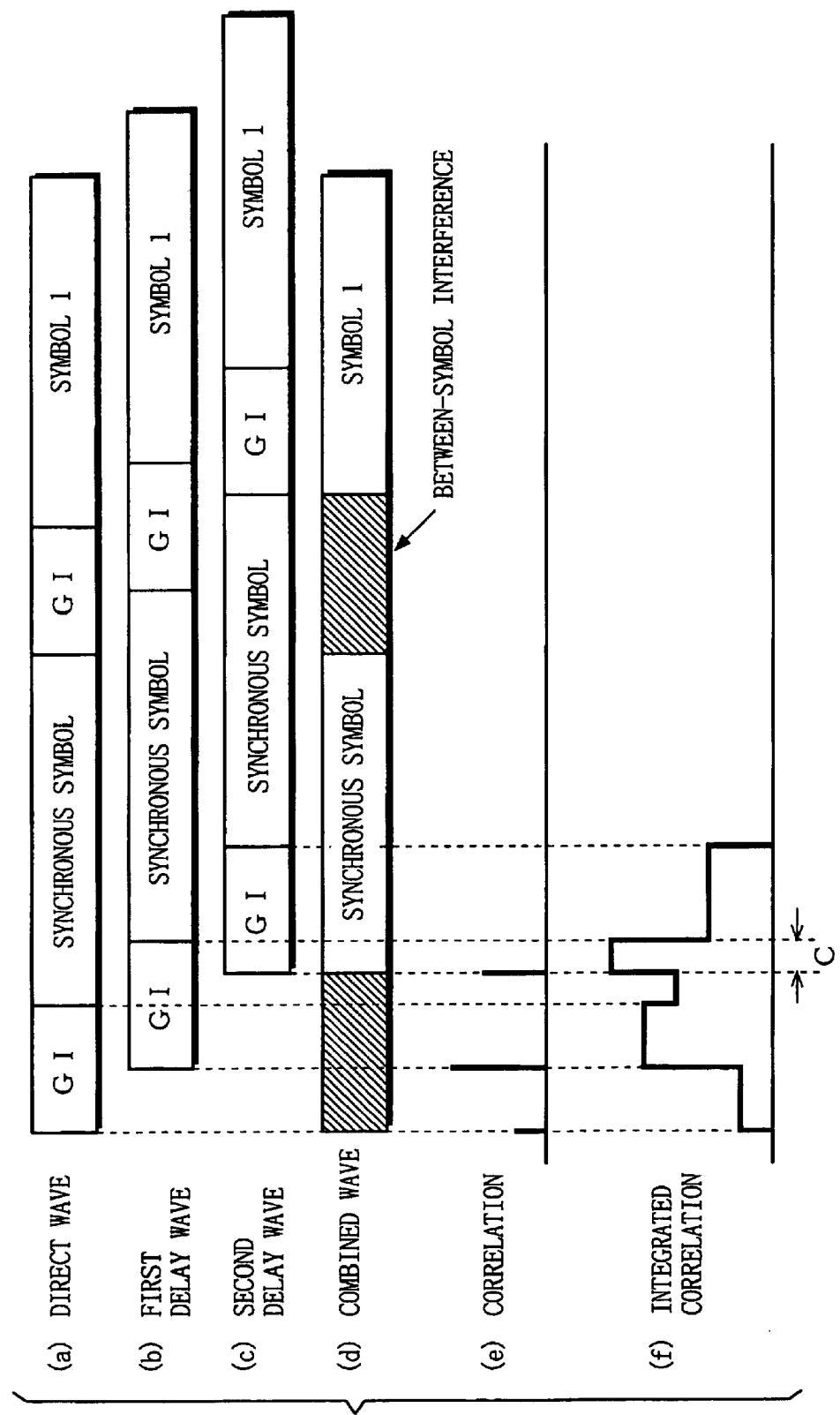
FIG. 6 is a diagram for explaining an exemplary operation of the impulse response estimator 112.

FIG. 6 shows a correlation and an integrated correlation in a case that a combined wave ((d) of FIG. 6) of a direct wave ((a) thereof) and first and second delay waves ((b) and (c) thereof) is provided to the apparatus for OFDM demodulation due to multipath. Herein, FIG. 6 exemplarily shows a case that a delay of the first delay wave is within the guard interval, but a delay of the second delay wave is not, and each power level thereof is "first delay wave>second delay wave>direct wave". In FIG. 6, the diagonally shaded area is a part where the between-symbol interference is observed.

In this case, as shown in (e) of FIG. 6, the correlation between the combined wave and the synchronous symbol signal calculated by the correlation calculator 107 appears three times, at the head of the direct wave, at the head of the first delay wave, and at the head of the second delay wave, and each is proportional to the power level thereof. If the correlation is integrated by the integral section width which is the time length of the guard interval in the integrator 108, the integrated correlation obtained thereby is as shown in (f) of FIG. 6. Therein, the interval C is the maximum. As is known from (d) of FIG. 6, in the case that a delay of the delay wave (second delay wave) is beyond the guard interval, the between-symbol interference occurs no matter how the symbol timing is set. To deal with such case, in the timing determination device 109, arbitrary timing within the interval C where the integrated correlation is maximum is set to the symbol timing. In this manner, the apparatus for OFDM demodulation can successfully reproduce the transmission data while minimizing influence of the between-symbol interference. To be more specific, setting the symbol timing in the interval C results in the between-symbol interference occurring at the tail of the valid symbol period. Such between-symbol interference, however, is due to the direct wave whose power level is low, whereby the influence of the interference can be minimized.

Figure 7:
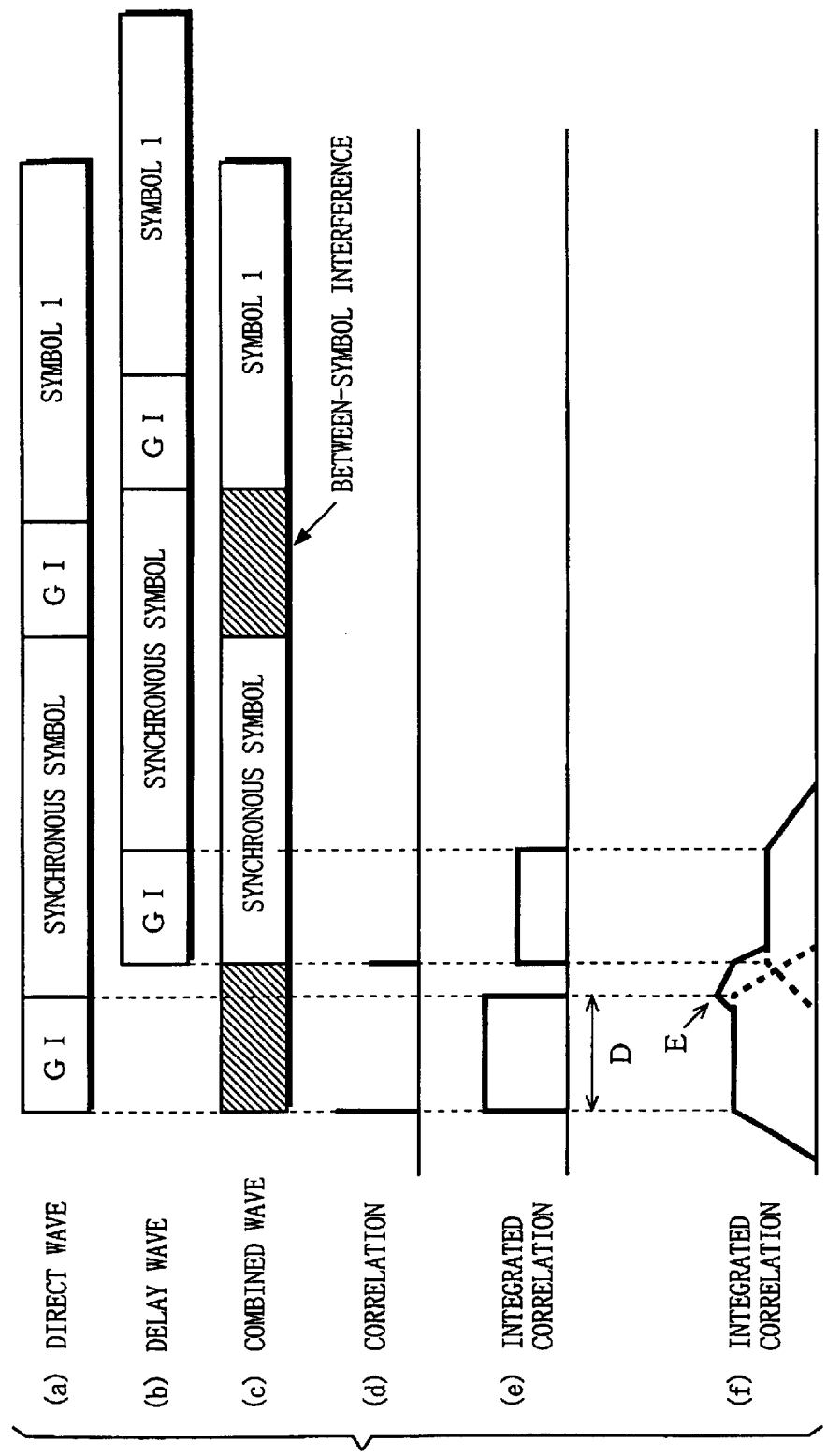
FIG. 7 is a diagram for explaining an exemplary operation of the impulse response estimator 112.

FIG. 7 shows a correlation and an integrated correlation in a case that a combined wave ((c) of FIG. 7) of a direct wave ((a) thereof) and a delay wave ((b) thereof) is provided to the apparatus for OFDM demodulation due to multipath. Herein, FIG. 7 exemplarily shows a case that a delay of the delay wave is beyond the guard interval, and a power level thereof is "direct wave>delay wave". In FIG. 7, the diagonally shaded area is a part where the between-symbol interference is observed.

In this case, as shown in (d) of FIG. 7, the correlation between the combined wave and the synchronous symbol signal calculated by the correlation calculator 107 appears twice, at the head of the direct wave and at the head of the delay wave, and each is proportional to the power level thereof. If the correlation is integrated by the integral section width which is the time length of the guard interval in the integrator 108, the integrated correlation obtained thereby is as shown in (e) of FIG. 7. Therein, the interval D is the maximum. Accordingly, by setting, to the symbol timing, arbitrary timing within the interval D where the integrated correlation is maximum in the timing determination device 109, the apparatus for OFDM demodulation can successfully reproduce the transmission data while minimizing the influence of the between-symbol interference. Herein, timing at the tail of the interval D is preferably set to the symbol timing for the purpose.

It is herein assumed that the integration technique for outputting a response in a manner described in (c) of FIG. 3 is applied to the integrator 108. When the above-described correlation ((d) of FIG. 7) is integrated by the integral section width in the integrator 108, an integrated correlation obtained thereby is as shown in (f) of FIG. 7. Accordingly, such integration technique makes it possible to easily obtain timing (point E) where the integrated correlation becomes maximum.

As described in the foregoing, according to the apparatus and method for OFDM demodulation of the first embodiment, the timing of the valid symbol period is controlled for Fourier transform to be so carried out as to minimize the between-symbol interference. This is done by first calculating a correlation between an incoming OFDM signal and a prestored synchronous symbol signal, secondly integrating the correlation by a predetermined integral section width, and lastly based on the integrated correlation obtained thereby, detecting the synchronous symbol.

In this manner, with the apparatus and method for OFDM demodulation of the first embodiment, the OFDM signal can be demodulated, i.e., the transmission data can be reproduced with the between-symbol interference minimized even if a transmission path characteristic varies with time.

(Second Embodiment)

Figure 8:
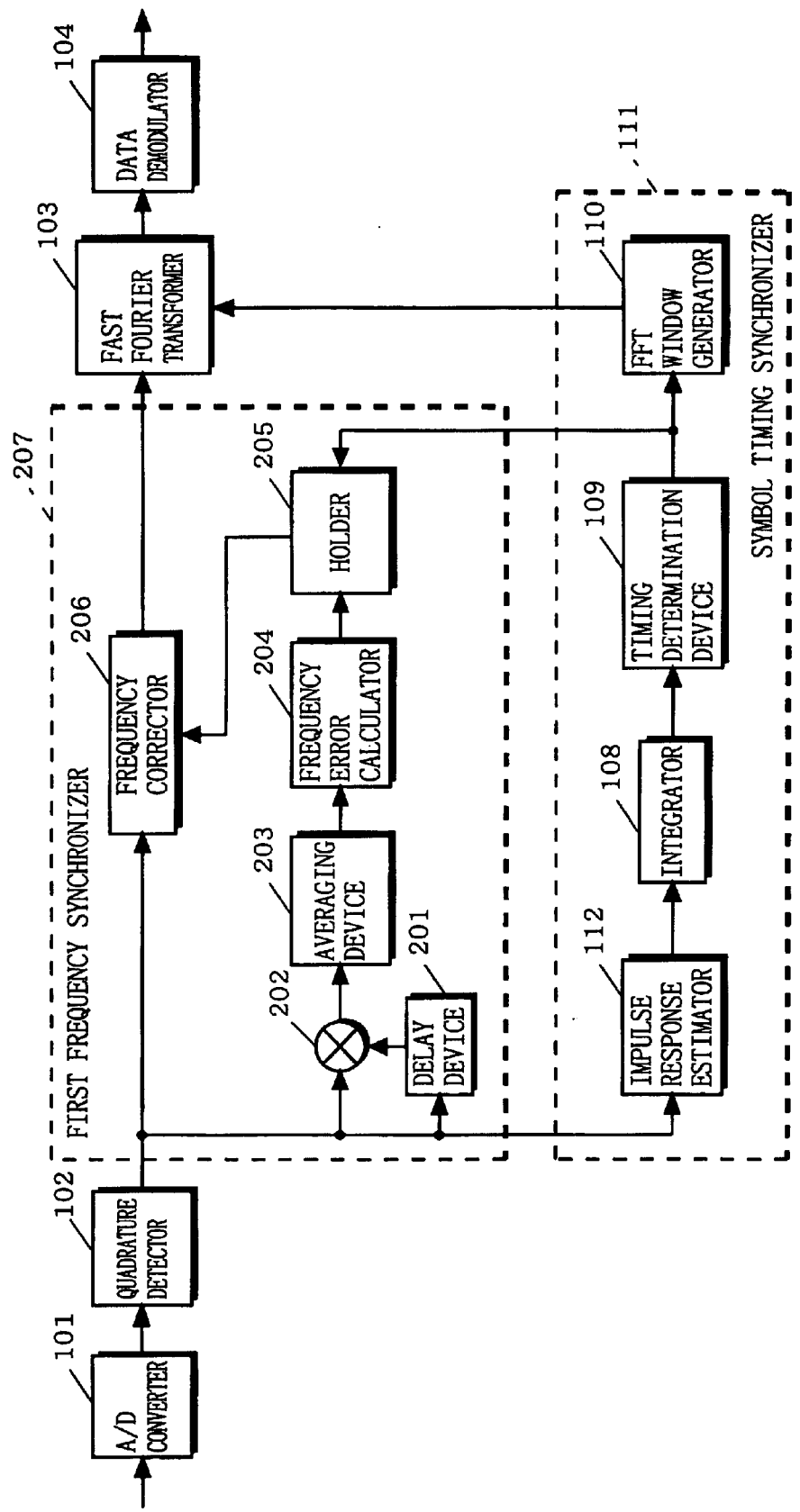
FIG. 8 is a block diagram showing the structure of an apparatus for OFDM demodulation according to a second embodiment of the present invention.

By referring to FIG. 8, an apparatus and a method for OFDM demodulation are described according to a second embodiment of the present invention.

FIG. 8 is a block diagram showing the structure of an apparatus for OFDM demodulation of the second embodiment. In FIG. 8, the apparatus is provided with the A/D converter 101, the quadrature detector 102, the fast Fourier transformer 103, the data demodulator 104, the symbol timing synchronizer 111, and a first frequency synchronizer 207. The first frequency synchronizer 207 includes a delay device 201, a multiplier 202, an averaging device 203, a frequency error calculator 204, a holder 205, and a frequency corrector 206.

As shown in FIG. 8, the apparatus for OFDM demodulation of the second embodiment is additionally provided with the first frequency synchronizer 207 compared with the apparatus of the first embodiment. The first frequency synchronizer 207 estimates and corrects a frequency shift among subcarriers based on a synchronous symbol to be inputted. Other constituents in the apparatus of the second embodiment are the same as those in the apparatus of the first embodiment, and are denoted by the same reference numerals and not described again.

A baseband signal converted in the quadrature detector 102 is forwarded to both the delay device 201 and the multiplier 202. The delay device 201 delays the baseband signal for a predetermined number of samplings for output. The number of samplings is determined depending on each characteristic of the synchronous symbols. For instance, when the synchronous symbol is provided with the guard interval, the number of samplings for the valid symbol is set thereto. The multiplier 202 multiplies the baseband signal outputted from the quadrature detector 102 by a complex conjugate of the baseband signal delayed in the delay device 201, and thus obtains a phase-difference vector (indicates how much the phase is shifted) therebetween. As described in the foregoing, a signal included in the guard interval is the one obtained by cyclically repeating a waveform of the valid symbol. Accordingly, multiplying a not-delayed signal and a signal delayed for the number of samplings for the valid symbol leads to a phase-difference vector among the same waveforms. This utilizes that, when a frequency shift is observed among subcarriers, a phase is differed between a signal in the vicinity of the head and a signal in the vicinity of the tail of the transmission symbol. Accordingly, a phase-difference vector calculated by the multiplier 202 tells a frequency shift (frequency error) at estimate.

Further, when the synchronous symbol is a signal taking an identical waveform periodically repeated at least twice in the symbol period, the number of samplings predetermined for the delay device 201 is regarded as being equal to that in a cycle of the signal. Specifically, in the case that the synchronous symbol is a signal having an identical waveform repeated for two cycles in the symbol period, assuming that the number of samplings in a cycle is N, the signal in the delay device 201 is delayed also for the N samplings. In this manner, the multiplier 202 accordingly obtains a phase-difference among the same waveforms.

The averaging device 203 sequentially receives the phase-difference vector obtained by the multiplier 202, and then averages the phase-difference vectors. At this time, the averaging device 203 may calculate an average-shift of the phase-difference vectors based on the number of samplings set by the delay device 201. Thereby, the averaging device 203 obtains an average phase-difference vector (phase shift on average) based on the number of samplings. Note that, by lengthening the cycle of the waveform repeated in the synchronous symbol on the transmitter side, the average phase-difference vector to be obtained by the apparatus for OFDM demodulation can be improved in accuracy. The frequency error calculator 204 is provided with the average phase-difference vector obtained by the averaging device 203, and then calculates an arc tangent ($\tan^{-1}$) thereof so as to obtain a frequency error signal. The frequency error signal is forwarded to the holder 205. The holder 205 holds the frequency error signal with the ending timing of the synchronous symbol outputted from the timing determination device 109. The holder 205 then outputs the frequency error signal on hold to the frequency corrector 206. With such hold processing, it becomes possible to utilize the frequency error signal obtained from the synchronous symbol for frequency correction of data symbols subsequent to the synchronous symbol. Based on the frequency error signal, the frequency corrector 206 performs frequency correction on the baseband signal converted by the quadrature detector 102. Such frequency correction is carried out by multiplying the baseband signal by a complex SIN wave corresponding to the frequency error.

As described above, the baseband signal after the frequency correction utilizing the synchronous symbol is forwarded to the fast Fourier transformer 103 for Fourier transform, and then is demodulated in the data demodulator 104. In this manner, the transmission data is reproduced in the data demodulator 104.

As is known from this, according to the apparatus and the method for OFDM demodulation of the second embodiment, in addition to the control described in the first embodiment, a frequency shift of an incoming OFDM signal can be corrected. This is implemented by averaging a phase shift among synchronous symbols, and from the average phase shift obtained thereby, a frequency error is calculated for the purpose.

In this manner, with the apparatus and the method for OFDM demodulation of the second embodiment, in addition to the effects attained in the first embodiment, demodulation can be carried out with higher accuracy first by correcting a frequency shift with a synchronous symbol identical to the one used for symbol synchronization, and then subjecting an OFDM signal after the correction to Fourier transform with symbol timing.

(Third Embodiment)

Figure 9:
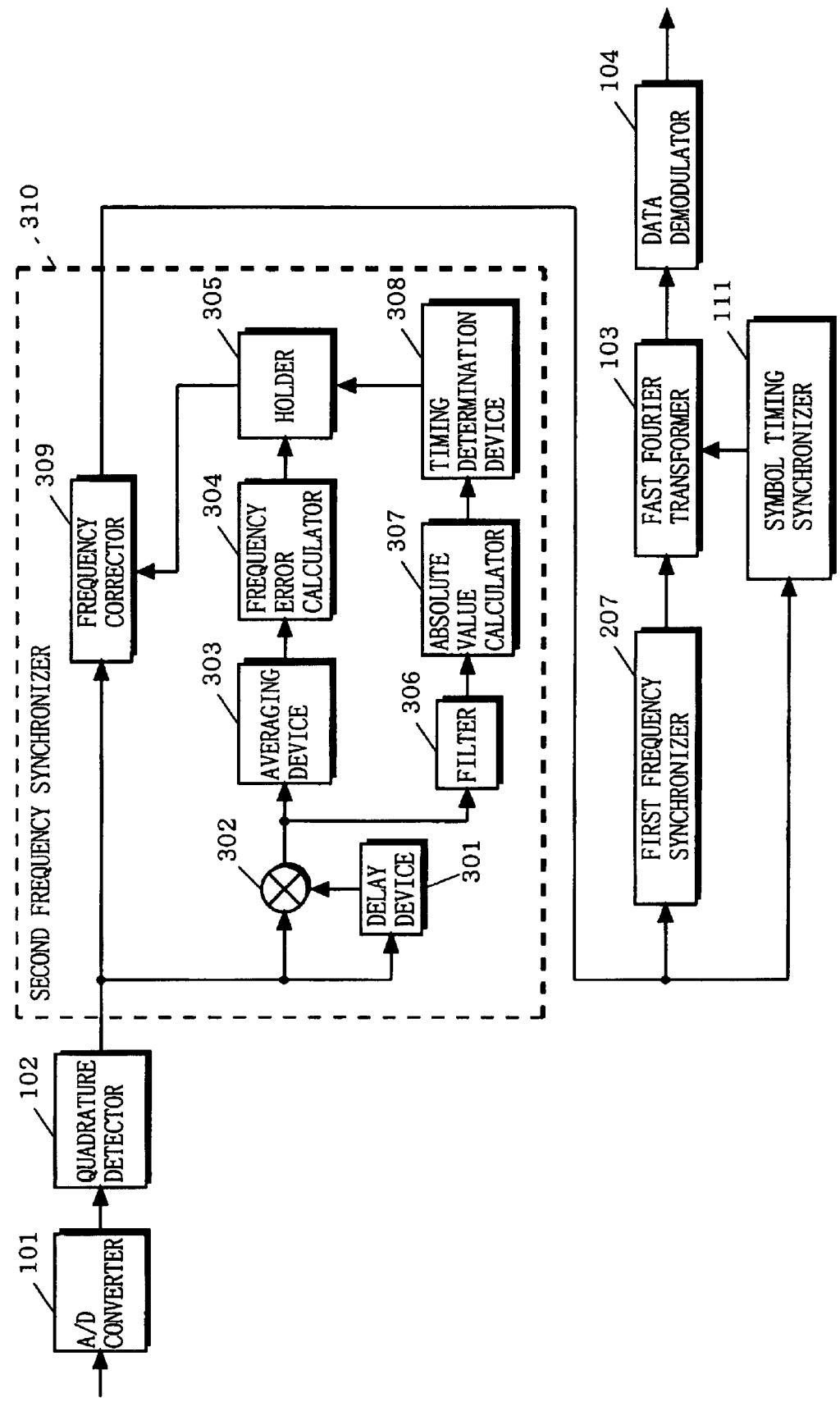
FIG. 9 is a block diagram showing the structure of an apparatus for OFDM demodulation according to a third embodiment of the present invention.
Figure 10:
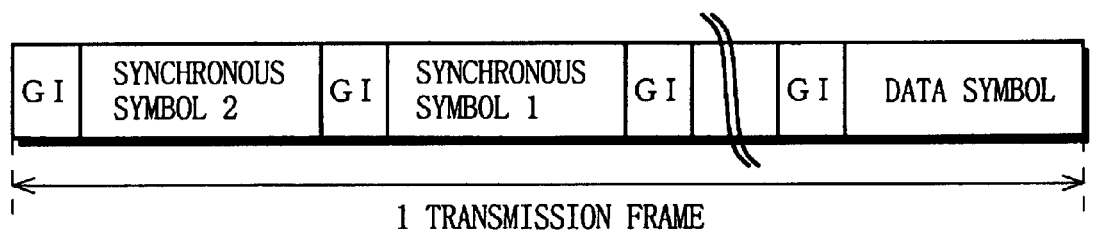
FIG. 10 is a diagram for explaining an OFDM signal applied in the third embodiment.

By referring to FIGS. 9 and 10, an apparatus and a method for OFDM demodulation are described according to a third embodiment of the present invention.

FIG. 9 is a block diagram showing the structure of the apparatus for OFDM demodulation of the third embodiment. In FIG. 9, the apparatus is provided with the A/D converter 101, the quadrature detector 102, the fast Fourier transformer 103, the data demodulator 104, the symbol timing synchronizer 111, the first frequency synchronizer 207, and a second frequency synchronizer 310. The second frequency synchronizer 310 includes a delay device 301, a multiplier 302, an averaging device 303, a frequency error calculator 304, a holder 305, a filter 306, an absolute value calculator 307, a timing determination device 308, and a frequency corrector 309.

As shown in FIG. 9, the apparatus for OFDM demodulation of the third embodiment is additionally provided with the second frequency synchronizer 310 compared with the apparatus of the second embodiment. The second frequency synchronizer 310 estimates and corrects a frequency shift among subcarriers based on a synchronous symbol different from the one used in the first frequency synchronizer 207. Other constituents in the apparatus of the third embodiment are the same as those in the apparatuses of the first and the second embodiments, and are denoted by the same reference numerals and not described again.

FIG. 10 shows the structure of an OFDM signal to be provided to the apparatus of the third embodiment. In FIG. 10, a synchronous symbol 1 is the one used in the symbol timing synchronizer 111 and the first frequency synchronizer 207, while a synchronous symbol 2 is the one used in the second frequency synchronizer 310.

The synchronous symbol 2 may be a signal having an identical waveform periodically repeated in the symbol period. Herein, similarly to other transmission symbols, a transmission symbol in which a guard interval is provided to a valid symbol period can be exemplarily used as the synchronous symbol 2. Preferably, in the synchronous symbol 2, the repetition cycle of the waveform in the symbol period is set to be shorter than that in the synchronous symbol 1.

After received such OFDM signal, the apparatus for OFDM demodulation of the third embodiment first establishes frequency synchronization by using the synchronous symbol 2, and then establishes synchronization in symbol timing and frequency by using the synchronous symbol 1. Accordingly, accuracy in detecting the synchronous symbol 1 can be further improved.

It is now described how the second frequency synchronizer 310 operates on a constituent basis.

A baseband signal converted in the quadrature detector 102 is forwarded to both the delay device 301 and the multiplier 302. The delay device 301 delays the baseband signal for a predetermined number of samplings for output. The number of samplings is determined depending on a characteristic of the synchronous symbol 2. For instance, when the synchronous symbol 2 is provided with the guard interval, the number of samplings for the valid symbol is set thereto. The multiplier 302 multiplies the baseband signal outputted from the quadrature detector 102 by a complex conjugate of the baseband signal delayed in the delay device 301, and thus obtains a phase-difference vector (indicates how much the phase is shifted) therebetween. As described in the foregoing, a signal included in the guard interval is the one obtained by cyclically repeating a waveform of the valid symbol. Accordingly, in a similar manner to the above, multiplying a not-delayed signal and a signal delayed for the number of samplings for the valid symbol leads to a phase-difference vector among the same waveforms. Accordingly, a phase-difference vector calculated by the multiplier 302 tells a frequency shift (frequency error) at estimate.

Further, when the synchronous symbol 2 is a signal having an identical waveform periodically repeated at least twice in the symbol period, as described in the foregoing, the number of samplings predetermined for the delay device 301 is regarded as being equal to that in a cycle of the signal. In this manner, the multiplier 302 accordingly obtains a phase-difference among the same waveforms. Note that, on the transmitter side, the repetition cycle of the waveform in the symbol period in the synchronous symbol 2 may be set shorter than that in the synchronous symbol 1. If that is the case, the number of samplings in the delay device 301 can be decreased in the apparatus for OFDM demodulation, whereby the frequency error can be estimated in a quicker manner. Further, the synchronous symbols 1 and 2 may share the same waveform. If this is the case, assuming that a delay in the delay device 201 in the first frequency synchronizer 207 is equal to the number of samplings for the transmission symbol, sampling is done more often to obtain the phase-difference vector. As a result, accuracy in estimating the frequency error can be further improved.

The averaging device 303 sequentially receives the phase-difference vector obtained by the multiplier 302, and then averages the phase-difference vectors. At this time, the averaging device 303 may calculate an average-shift of the phase-difference vectors based on the number of samplings set by the delay device 301. Thereby, the averaging device 303 obtains an average phase-difference vector (phase shift on average) based on the number of samplings. The frequency error calculator 304 is provided with the average phase-difference vector obtained by the averaging device 303, and then calculates an arc tangent ($\tan^{-1}$) thereof so as to obtain a frequency error signal. The frequency error signal obtained thereby in the frequency error calculator 304 is forwarded to the holder 305.

The filter 306 sequentially receives the phase-difference vector obtained by the multiplier 302 for smoothing. The absolute value calculator 307 receives the smoothed phase-difference vectors from the filter 306, and then determines the magnitude thereof. The timing determination device 308 receives the magnitude of the phase-difference vectors determined by the absolute value calculator 307, and according thereto, determines an ending timing of the synchronous symbol 2. Herein, the phase-difference vectors remain invariable in magnitude in a period of the synchronous symbol 2 but otherwise randomly vary.

Therefore, the timing determination device 308 detects whether the phase-difference vectors in a predetermined period remain invariable in magnitude. The timing determination device 308 then determines timing when the phase-difference vectors start to change in magnitude as an ending time of the synchronous symbol 2. Such determination is made by first calculating a difference in magnitude between the phase-difference vectors being currently sampled and those sampled one sampling before, and then detects whether the difference is beyond a predetermined threshold value. In an alternate manner, the timing determination device 308 first detects and holds a value indicating invariability of the phase-difference vectors, and then detects a time point when the phase-difference vectors start to change proportionately less than the value e.g., 80%).

The holder 305 holds the frequency error signal with the ending timing of the synchronous symbol 2 outputted from the timing determination device 308. The holder 305 then outputs the frequency error signal on hold to the frequency corrector 309. With such hold processing, it becomes possible to utilize the frequency error signal obtained from the synchronous symbol 2 for frequency correction of the synchronous symbol 1 and data symbols subsequent to the synchronous symbol 2. Based on the frequency error signal, the frequency corrector 309 performs frequency correction on the baseband signal converted by the quadrature detector 102. Such frequency correction is carried out by multiplying the baseband signal by a complex SIN wave corresponding to the frequency error.

As described above, the baseband signal after the frequency correction utilizing the synchronous symbol 2 in the second frequency synchronizer 310 is forwarded to both the symbol timing synchronizer 111 and the first frequency synchronizer 207. Thereafter, the symbol timing synchronizer 111 establishes symbol synchronization utilizing data symbols frequency-corrected based on the synchronous symbol 2. The first frequency synchronizer 207 also performs frequency correction with the synchronous symbol 1 frequency-corrected based on the synchronous symbol 2. The frequency-corrected baseband signal utilizing the synchronous symbol 1 is forwarded to the fast Fourier transformer 103 for Fourier transform, then is demodulated in the data demodulator 104. In this manner, the transmission data is reproduced in the data demodulator 104.

As is known from this, according to the apparatus and the method for OFDM demodulation of the third embodiment, in addition to the control described in the first and second embodiments, a frequency shift is corrected in the second frequency synchronizer 310 before a correlation between an OFDM signal and a synchronous symbol signal is calculated.

In this manner, with the apparatus and the method for OFDM demodulation of the third embodiment, in addition to the effects attained in the first and second embodiments, accuracy in detecting the synchronous symbol 1 can be further improved. This is because a frequency-corrected signal utilizing the synchronous symbol 2 is used for symbol synchronization and frequency correction. Further, higher-speed frequency correction is implemented by using, as the synchronous symbol 2, a signal whose repetition cycle of a waveform is shorter.

(Fourth Embodiment)

Figure 11:
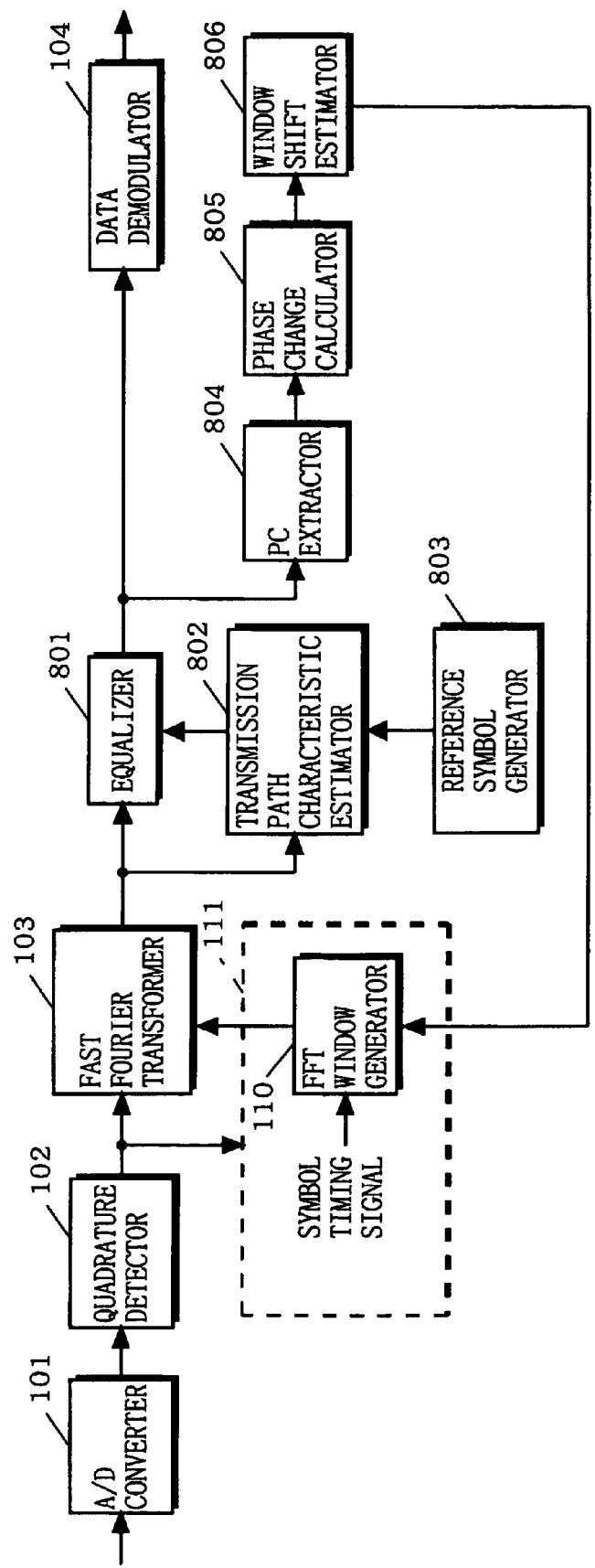
FIG. 11 is a block diagram showing the structure of an apparatus for OFDM demodulation according to a fourth embodiment of the present invention.
Figure 12:
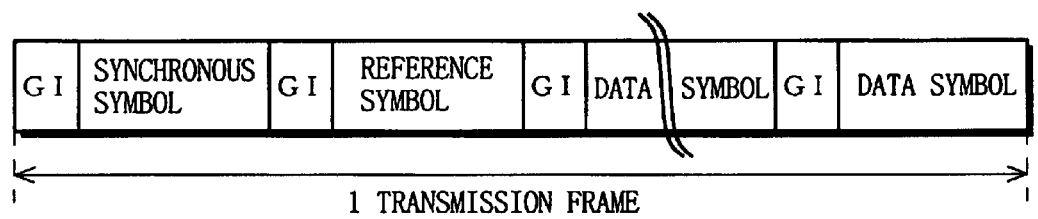
FIG. 12 is a diagram for explaining an OFDM signal applied in the fourth embodiment.

By referring to FIGS. 11 to 13, an apparatus and a method for OFDM demodulation are described according to a fourth embodiment of the present invention.

FIG. 11 is a block diagram showing the structure of the apparatus for OFDM demodulation of the fourth embodiment. In FIG. 11, the apparatus is provided with the A/D converter 101, the quadrature detector 102, the fast Fourier transformer 103, the data demodulator 104, the symbol timing synchronizer 111, an equalizer 801, a transmission path estimator 802, a reference symbol generator 803, a pilot carrier (PC) extractor 804, a phase change calculator 805, and a window shift estimator 806.

As shown in FIG. 11, the apparatus for OFDM demodulation of the fourth embodiment is additionally provided with the equalizer 801, the transmission path estimator 802, the reference symbol generator 803, the PC extractor 804, the phase change calculator 805, and the window shift estimator 806 compared with the apparatus of the first embodiment. Other constituents in the apparatus of the fourth embodiment are the same as those in the apparatus of the first embodiment, and are denoted by the same reference numerals and not described again.

FIG. 12 shows the structure of an OFDM signal to be inputted to the apparatus of the fourth embodiment. A synchronous symbol in FIG. 12 is the one used in the symbol timing synchronizer 111 and the first frequency synchronizer 207. Symbol timing detected by the synchronous symbol is a basis for demodulation to be carried out for symbols subsequent to the synchronous symbol. A known reference symbol is used to estimate information about transmission path characteristic. Based on the estimation, symbols subsequent to the reference symbol are equalized. Herein, since any known symbol may be the reference symbol, the synchronous symbol may be used as the reference symbol.

Next below, it is described in detail the operation of the equalizer 801, the transmission path estimator 802, the reference symbol generator 803, the PC extractor 804, the phase change calculator 805, and the window shift estimator 806. Based on the symbol timing signal detected by utilizing the synchronous symbol, the FFT window generator 110 generates an FFT window signal, which provides the fast Fourier transformer 103 with timing to operate. The fast Fourier transformer 103 subjects, based on the FFT window signal, the received baseband signal to Fourier transform in the valid symbol period to obtain a frequency-domain signal. Symbols converted into the frequency-domain signal are forwarded to both the equalizer 801 and the transmission path estimator 802.

The reference symbol generator 803 generates a frequency-domain signal Xref(k) of the known reference symbol. The reference symbol generator 803 can be implemented by a memory circuit, for example. In detail, the memory circuit is previously stored with a signal whose waveform is identical to that of the reference symbol inserted into the transmission frame on the transmitter side, whereby the signal Xref(k) can be generated by reading out the stored signal.

Based on the reference symbol signal, the transmission path estimator 802 estimates, under a technique next below, the information about transmission path characteristic indicating an impulse response on the transmission path.

Assuming that a transmitting signal from the transmitter is x(t), a received signal received by the receiver is r(t), and a transmission path characteristic between the transmitter and the receiver is h(t), the following equation is established thereamong:

$$R(k)=H(k)\times X(k)$$

where R(k), H(k), and X(k) are Fourier-transformed values of r(t), h(t), and x(t).

Therefore, with the transmitting signal X(k) being known, the transmission path characteristic H(k) can be estimated by the following equation:

$$H(k)=R(k)/X(k)$$

Accordingly, the transmission path estimator 802 divides a reference symbol signal Rref(k) of the received signal by the signal Xref(k) generated by the reference symbol generator 803 so as to estimate the transmission path characteristic H(k).

Assuming that a transmitting signal of a data symbol from the transmitter is Xdata(k), a received signal of a data symbol received by the apparatus for OFDM demodulation is Rdata(k), and a transmission path characteristic between the transmitter and the apparatus is H'(k), the following equation is established thereamong:

$$Rdata(k)=H'(k)\times Xdata(k)$$

Herein, if the transmission path characteristic H(k) estimated from the reference symbol is approximately equal to the transmission path characteristic H'(k) of the data symbol, the transmitting signal of the data symbol Xdata(k) may be reproduced by dividing the received signal of the data symbol Rdata(k) by the transmission path characteristic H(k).

Therefore, the equalizer 801 equalizes the OFDM signal by dividing the received signal of the data symbol Rdata(k) by the transmission path characteristic H(k) estimated by the transmission path estimator 802.

In the case that any sampling frequency shift is observed between the transmitter and the receiver, the symbol timing may be also shifted. It is described in detail by referring to FIG. 13. In FIG. 13, a transmission symbol includes a guard interval having a number of samplings L and a valid symbol period having a number of samplings M. A plurality of transmission symbols structure a transmission frame.

On the receiver side, a synchronous symbol is detected so as to generate an FFT window signal indicating the valid symbol period in the respective transmission symbols. Herein, the number of samplings L and M are both known. Therefore, starting with detection timing of the synchronous symbol, the FFT window signal generated on the receiver side has a Low-level waveform repeated in a period for the number of samplings L, but a High-level waveform in a period for the number of samplings M.

If the sampling frequency is shifted between the transmitter and the receiver, a time length T for one sampling on the transmitter side and a time length T' therefor on the receiver side show a difference therebetween. Accordingly, even if the number of samplings M is the same, the time length for M samplings on the transmitter side is (M×T), but on the receiver side (M×T'), and thus are differed. Consequently, a shift starts to be generated between the valid symbol period of the received signal and the period in which the FFT window signal is in High level. The shift is accumulated and thus becomes large for data symbols toward the tail of the transmission frame.

With the timing of the FFT window signal shifted, the frequency-domain signal may have phase shift in the symbols. At this time, the received signal R(k) is expressed as follows:

$$R(k)=H(k)\times X(K)\times \exp(-j\times 2\pi \times k\times \Delta t/N)$$

where N is the number of FFT points (the number of samplings in the valid symbol period), k is a subcarrier frequency, and Δt is a timing shift of the FFT window signal.

As is known from this, even if the received signal R(k) is equalized by dividing the same by the transmission path characteristic H(k) estimated by the reference symbol, a term of the phase shift caused by the timing shift Δt of the FFT window signal cannot be deleted from the above equation. Provided that the received signal after the equalization is R'(k), the following equation is established:

$$R'(k)=X(k)\times \exp(-j\times 2\pi \times k\times \Delta t/N)$$

Therefore, in the transmitter, a plurality of predetermined subcarriers in the transmission symbols are each assigned a known pilot carrier as a reference phase. These subcarriers k (k=k0, k1, . . . kn) in the transmitting signal X(k) are supposedly known. The pilot carriers are each exemplarily assigned to subcarriers k at regular frequency intervals, or may be assigned to the subcarriers k at predetermined irregular intervals. Herein, the predetermined irregular interval may be defined by PN series.

Since the pilot carriers X(k) for transmission are known, a phase difference Φ(k) from pilot carriers R'(k) for reception is calculated as follows:

$$\Phi(k)=-2\pi \times k \times \Delta t/N$$

As is known from this, finding a change in the phase difference Φ(k) with respect to the subcarriers k lead to the timing shift Δt of the FFT window signal.

Thereafter, the PC extractor 804 extracts pilot carriers from the received signal equalized by the equalizer 801. The extracted pilot carriers are outputted to the phase change calculator 805. The phase change calculator 805 calculates a phase of the pilot carriers and then a phase change with respect to the subcarriers k. The phase change obtained thereby is supplied to the window shift estimator 806. Based on the phase change with respect to the subcarriers k in the transmission symbols, the window shift estimator 806 estimates the timing shift Δt of the FFT window signal. The estimated timing shift Δt is provided to the FFT window generator 110. The FFT window generator 110 adjusts timing of generating the FFT window signal based on the timing shift Δt.

As described above, according to the apparatus and method for OFDM demodulation of the fourth embodiment, in addition to the control described in the first embodiment, an OFDM signal is equalized after a transmission path is estimated from a received reference symbol. Further, pilot carriers are extracted from the equalized signal, and based on a phase change of the pilot carriers, a timing shift of the FFT window signal at the time of Fourier transform is estimated and then corrected.

In this manner, with the apparatus and method for OFDM demodulation of the fourth embodiment, in addition to the effects attained in the first embodiment, symbols can be demodulated under symbol synchronization even if a sampling frequency shift is observed.

(Fifth Embodiment)

Alternatively, any influence of the timing shift Δt of the FFT window signal may be corrected as described next below in a fifth embodiment. By referring to FIG. 14, it is described an apparatus and a method for OFDM demodulation of the fifth embodiment.

FIG. 14 is a block diagram showing the structure of the apparatus for OFDM demodulation of the fifth embodiment. In FIG. 14, the apparatus of the fifth embodiment is additionally provided with a transmission path information corrector 901 and a phase shift estimator 902 compared with the apparatus of the fourth embodiment.

The phase change estimator 805 calculates, similarly to the fourth embodiment, the phase difference Φ(k) with respect to the subcarriers k as follows:

$$\Phi(k)=-2\pi \times k \times \Delta t/N$$

With the phase difference Φ(k), the phase shift estimator 902 estimates a phase shift P(k) through the following calculation:

$$P(k)=\exp(\Phi(k))\exp(-j \times 2\pi \times k \times \Delta t/N)$$

The transmission path information corrector 901 multiplies the phase shift P(k) and the above-estimated information about transmission path characteristic H(k) so as to obtain the corrected information about transmission path characteristic Hp(k).

$$Hp(k)=H(k) \times P(k)$$

The equalizer 801 divides the received signal R(k) by the corrected information about transmission path characteristic Hp(k) so as to equalize the received signal R(k) (=R'(k)).

$$R(k)=H(k) \times X(k) \times \exp(-j \times 2\pi \times k \times \Delta t/N)$$

$$R'(k)=R(k)/Hp(k)=X(k)$$

Alternatively, the information about transmission path characteristic H(k) is corrected by the phase shift P(k) caused by the estimated timing shift Δt, and with the corrected information about transmission path characteristic Hp(k), the received signal R(k) may be equalized.

If the estimated timing shift Δt is closer to the sampling frequency, such operation as described next below may be possible. The FFT window generator 110 adjusts the timing of generating the FFT window signal. When the timing shift Δt is smaller than the sampling frequency, the transmission path information corrector 901 corrects the information about transmission path characteristic so that the phase shift caused by the timing shift Δt is corrected. With the timing of generating the FFT window signal adjusted by the FFT window generator 110, the window shift estimator 806 causes the transmission path information corrector 901 to operate based on the adjusted timing, and then the transmission path information corrector 901 may correct the phase shift caused by the timing change of the FFT window signal.

As is obvious from this, demodulation can be carried out with higher accuracy by demodulating the received signal R'(k) equalized in the equalizer 801 in the data demodulator 104.

(Sixth Embodiment)

Alternatively, any influence of the timing shift Δt of the FFT window signal may be corrected as described next below in a sixth embodiment. By referring to FIG. 15, an apparatus and a method for OFDM demodulation are described of the sixth embodiment.

Figure 15:
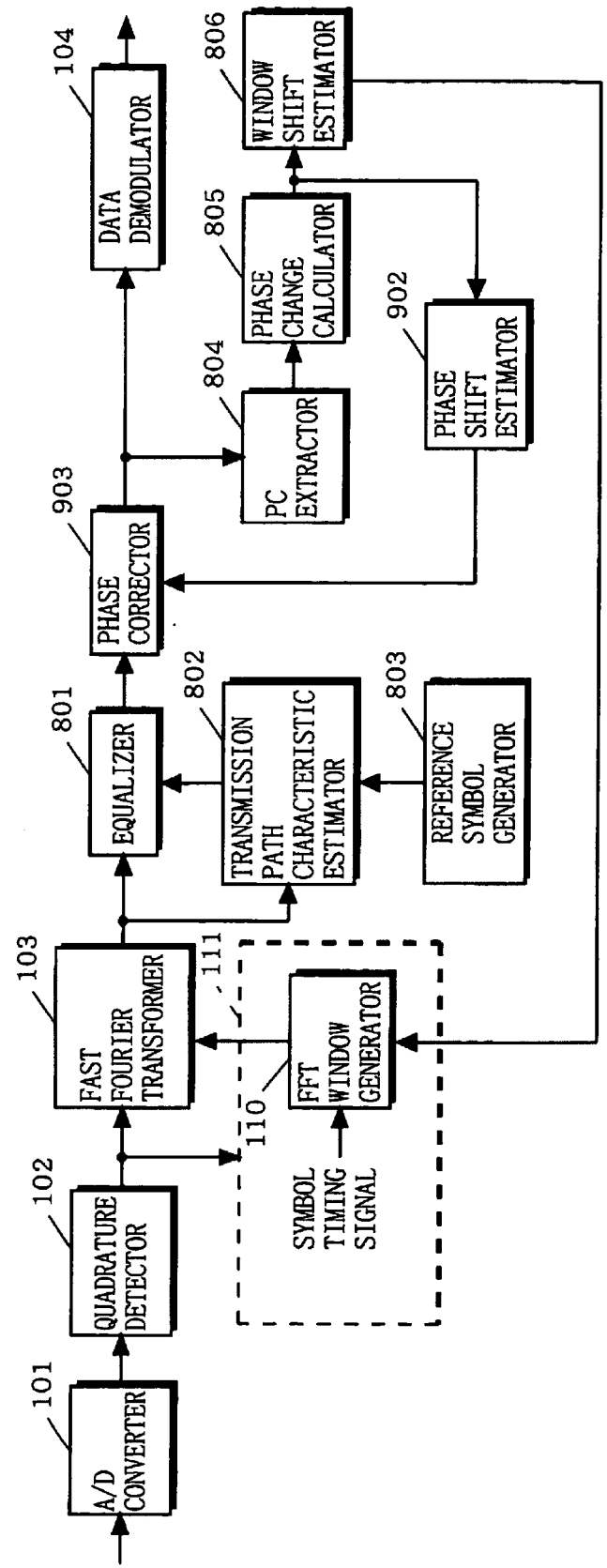
FIG. 15 is a block diagram showing the structure of an apparatus for OFDM demodulation according to a sixth embodiment of the present invention.

FIG. 15 is a block diagram showing the structure of the apparatus for OFDM demodulation of the sixth embodiment. In FIG. 15, the apparatus of the sixth embodiment is additionally provided with the phase shift estimator 902 and a phase corrector 903 compared with the apparatus of the fourth embodiment.

The phase change estimator 805 calculates, similarly to the fourth embodiment, the phase difference Φ(k) with respect to the subcarriers k as follows:

$$\Phi(k)=-2\pi \times k \times \Delta t/N$$

With the phase difference Φ(k), the phase shift estimator 902 estimates a phase shift P(k) through the following calculation:

$$P(k)=\exp(\Phi(k))=\exp(-j \times 2\pi \times k \times \Delta t/N)$$

The equalizer 801 divides the received signal R(k) by the information about transmission path characteristic H(k) so as to equalize the received signal R(k) (=R'(k)).

$$R(k)=H(k) \times X(k) \times \exp(-j \times 2\pi \times k \times \Delta t/N)$$

$$R'(k)=R(k)/H(k)=X(k) \times \exp(-j \times 2\pi \times k \times \Delta t/N)$$

The phase corrector 903 inversely shifts, by the phase shift P(k), the received signal R' equalized by the equalizer 801 so as to correct the phase. In order to inversely shift the phase, the received signal R'(k) is multiplied by a complex conjugate of the phase shift P(k).

$$R''(k)=R'(k) \times \exp(j \times 2\pi \times k \times \Delta t/N)=X(k)$$

As is known from this, demodulation can be carried out with higher accuracy by demodulating the received signal R'(k), which is equalized in the equalizer 801 and then phase-corrected in the phase corrector 903, in the data demodulator 104.

Note that, the apparatuses in the fourth to sixth embodiments are structured by adding, to the apparatus for OFDM demodulation of the first embodiment, the equalizer 801, the transmission path estimator 802, the reference symbol generator 803, the PC extractor 804, the phase change calculator 805, the window shift estimator 806, the transmission path information corrector 901, the phase shift estimator 902, and the phase corrector 903. Such structures are not restrictive, and the above-described constituents can be added to the apparatuses of the second and third embodiments.

Further, the calculation processing carried out in the apparatuses of first to sixth embodiments can be implemented by a digital signal processor (DSP), for example. Still further, such calculation processing can be implemented by carrying out a program recorded on a recording medium as a computer program for steps of the calculation processing.

While the invention has been described in detail, the foregoing description is in all aspects illustrative and not restrictive. It is understood that numerous other modifications and variations can be devised without departing from the scope of the invention.

What is claimed is:

1. An OFDM demodulation apparatus for demodulating an OFDM signal which includes a specific synchronous symbol and an OFDM data symbol structured by a valid symbol period and a guard interval, said apparatus comprising:
   an impulse response estimation part for estimating an impulse response from the OFDM signal based on the synchronous symbol;
   an integration part for integrating an output obtained by estimation in said impulse response estimation part;
   a determination part for detecting symbol timing indicating a period where an output obtained by integration in said integration part is maximum;
   a window timing generation part for generating, according to the symbol timing, window timing including information which is capable of providing the valid symbol period; and
   a Fourier transformation part for subjecting the OFDM signal to Fourier transform according to the window timing.

2. The OFDM demodulation apparatus according to claim 1, when an identical waveform is periodically transmitted in the synchronous symbol at least twice, said apparatus further comprising:
   a delay part for delaying the OFDM signal for a predetermined number of samplings;
   a multiplication part for multiplying a signal obtained by delay in said delay part and the OFDM signal;
   an averaging part for averaging a signal obtained by multiplication in said multiplication part;
   a frequency error calculation part for calculating a frequency error based on a signal obtained by averaging in said averaging part;
   a hold part for holding the frequency error according to the symbol timing; and
   a frequency correction part for correcting a frequency shift of the OFDM signal according to the frequency error provided by said hold part, wherein said Fourier transformation part subjects, to Fourier transform, the OFDM signal with frequency shift corrected by said frequency correction part according to the window timing.

3. The OFDM demodulation apparatus according to claim 1, when an identical waveform is periodically transmitted in the synchronous symbols at least twice, said apparatus further comprising:
   a first delay part for delaying the OFDM signal, as a first OFDM signal, for a first predetermined number of samplings;
   a first multiplication part for multiplying a signal obtained by delay in said first delay part and the first OFDM signal;
   a first averaging part for averaging a signal obtained by multiplication in said first multiplication part;
   a first frequency error calculation part for calculating a first frequency error based on a signal obtained by averaging in said first averaging part;
   a filter part for smoothing a signal obtained by multiplication in said first multiplication part;
   an absolute value calculation part for calculating an absolute value of a signal obtained by smoothing in said filter part;
   a first determination part for determining, according to the absolute value, a correlation between the first OFDM signal and the signal obtained by delay in said first delay part, and detecting symbol timing of the first OFDM signal;
   a first hold part for holding the first frequency error according to the symbol timing detected by said first determination part;
   a first frequency correction part for correcting a frequency shift of the first OFDM signal according to the first frequency error provided by said first hold part;
   a second delay part for delaying, for a second predetermined number of samplings, the first OFDM signal, as a second OFDM signal, with frequency shift corrected by said first frequency correction part;
   a second multiplication part for multiplying a signal obtained by delay in said second delay part and the second OFDM signal;
   a second averaging part for averaging a signal obtained by multiplication in said second multiplication part;
   a second frequency error calculation part for calculating a second frequency error based on a signal obtained by averaging in said second averaging part;
   a second hold part for holding the second frequency error according to the symbol timing detected by said determination part; and
   a second frequency correction part for correcting a frequency error of the second OFDM signal according to the second frequency error provided by said second hold part, wherein
   said impulse response estimation part estimates the impulse response from the second OFDM signal, and
   said Fourier transformation part subjects, to Fourier transform, the second OFDM signal with frequency shift corrected by said second frequency conversion part according to the window timing.

4. The OFDM demodulation apparatus according to claim 3, wherein
   said first determination part receives the absolute value calculated by said absolute value calculation part, detects a value for invariability thereof, and then detects the absolute value showing a predetermined proportion to the invariable value.

5. The OFDM demodulation apparatus according to claim 1, wherein said integration part regards a time length of the guard interval as an integration section, and integrates an incoming signal while sequentially shifting a location of the integration section with respect to the incoming signal.

6. The OFDM demodulation apparatus according to claim 1, wherein said integration part regards a time length of the guard interval and a predetermined time length before and after the guard interval as an integration section, and by integrating an incoming signal while sequentially shifting a location of the integration section with respect to the incoming signal, responds before and after a rectangular impulse response in the time length of the guard interval.

7. The OFDM demodulation apparatus according to claim 1, wherein said integration part regards a time length of the guard interval and a predetermined time length before and after the guard interval as an integration section, and by integrating an incoming signal while sequentially shifting a location of the integration section with respect to the incoming signal, responds with a monotonous increase before a rectangular impulse response in the time length of the guard interval and a monotonous decrease after the rectangular impulse response.

8. The OFDM demodulation apparatus according to claim 1, wherein said impulse response estimation part comprises:
   a synchronous symbol generation part for generating a signal identical to the synchronous symbol;
   a correlation part for calculating a signal indicating how the signal generated by said synchronous symbol generation part and the OFDM signal are correlated to each other; and
   a correlation calculation part for calculating a correlation from the signal obtained by calculation in said correlation part.

9. The OFDM demodulation apparatus according to claim 8, wherein
   said correlation calculation part calculates an absolute value of a complex vector (i, q) of the incoming signal.

10. The OFDM demodulation apparatus according to claim 8, wherein
    said correlation calculation part calculates a sum of an absolute value of i and an absolute value of q from a complex vector (i, q) of the incoming signal.

11. The OFDM demodulation apparatus according to claim 8, wherein
    said correlation calculation part calculates a sum of a square of i and a square of q from a complex vector (i, q) of the incoming signal.

12. The OFDM demodulation apparatus according to claim 1, wherein said impulse response estimation part comprises:
    a synchronous symbol generation part for generating a signal whose frequency domain is identical to the synchronous symbol;
    a multiplication part for multiplying a signal provided by said Fourier transformation part and the signal provided by said synchronous symbol generation part;
    an inverse Fourier transformation part for subjecting, to inverse Fourier transform, a signal obtained by multiplication in said multiplication part; and
    a correlation calculation part for calculating a correlation from a signal provided by said inverse Fourier transformation part.

13. The OFDM demodulation apparatus according to claim 12, wherein
    said correlation calculation part calculates an absolute value of a complex vector (i, q) of the incoming signal.

14. The OFDM demodulation apparatus according to claim 12, wherein
    said correlation calculation part calculates a sum of an absolute value of i and an absolute value of q from a complex vector (i, q) of the incoming signal.

15. The OFDM demodulation apparatus according to claim 12, wherein
    said correlation calculation part calculates a sum of a square of i and a square of q from a complex vector (i, q) of the incoming signal.

16. An OFDM demodulation method for demodulating an OFDM signal which includes a specific synchronous symbol and an OFDM data symbol structured by a valid symbol period and a guard interval, said method comprising:
    an impulse response estimation operation of estimating an impulse response from the OFDM signal based on the synchronous symbol;
    an integration operation of integrating an output obtained by estimation in said impulse response estimation operation;
    a determining operation of detecting symbol timing indicating a period where an output obtained by integration in said integration operation is maximum;
    a window timing generation operation of generating, according to the symbol timing, window timing including information which is capable of providing the valid symbol period; and
    a Fourier transformation operation of subjecting the OFDM signal to Fourier transform according to the window timing.

17. The OFDM demodulation method according to claim 16, when an identical waveform is periodically transmitted in the synchronous symbol at least twice, said method further comprising:
    delaying the OFDM signal for a predetermined number of samplings;
    multiplying a signal obtained by delay in said delaying operation and the OFDM signal;
    averaging a signal obtained by multiplication in said multiplying operation;
    calculating a frequency error based on a signal obtained by averaging in said averaging operation;
    holding the frequency error according to the symbol timing; and
    correcting a frequency shift of the OFDM signal according to the frequency error provided in said holding operation, wherein in said Fourier-transform operation, the OFDM signal with frequency shift corrected is subjected to Fourier transform according to the window timing.

18. The OFDM demodulation method according to claim 16, when an identical waveform is periodically transmitted in the synchronous symbol at least twice, said method further comprising:
    a first delay operation of delaying the OFDM signal as a first OFDM signal, for a first predetermined number of samplings;
    a first multiplication operation of multiplying a signal obtained by delay in said first delay operation and the first OFDM signal;

a first averaging operation of averaging a signal obtained by multiplication in said first multiplication operation;

a first frequency error calculating operation of calculating a first frequency error based on a signal obtained by averaging in said first averaging operation;

smoothing a signal obtained by multiplication in said first multiplication operation;

calculating an absolute value of a signal obtained by smoothing in smoothing operation;

a first determination operation of determining, according to the absolute value, a correlation between the first OFDM signal and the signal obtained by delay in said first delay operation, and detecting symbol timing of the first OFDM signal;

a first holding operation of holding the first frequency error according to the symbol timing detected in said first determination operation;

a first frequency correction operation of correcting a frequency shift of the first OFDM signal according to the first frequency error held;

a second delay operation of delaying, for a second predetermined number of samplings, the first OFDM signal, as a second OFDM signal, with frequency shift corrected;

a second multiplication operation of multiplying a signal obtained by delay in said second delay operation and the second OFDM signal;

a second averaging operation of averaging a signal obtained by multiplication in said second multiplication operation;

a second frequency error calculating operation of calculating a second frequency error based on a signal obtained by averaging in said second averaging operation;

a second holding operation of holding the second frequency error according to the symbol timing detected in said determination operation; and a second frequency correction operation of correcting a frequency shift of the second OFDM signal according to the second frequency error held, wherein in said estimating operation, an impulse response is estimated from the second OFDM signal, and in said Fourier-transform operation, according to the window timing, the second OFDM signal with frequency shift corrected is subjected to Fourier transform.

19. The OFDM demodulation method according to claim 18, wherein in said first determination operation, a value for invariability of the absolute value is detected, and then the absolute value showing a predetermined proportion to the invariable value is detected.

20. The OFDM demodulation method according to claim 16, wherein in said integrating operation, a time length of the guard interval is regarded as an integration section, and an incoming signal is integrated while a location of the integration section is sequentially shifted with respect to the incoming signal.

21. The OFDM demodulation method according to claim 16, wherein in said integrating operation, a time length of the guard interval and a predetermined time length before and after the guard interval are regarded as an integration section, and by integrating an incoming signal while sequentially shifting a location of the integration section with respect to the incoming signal, a response is provided before and after a rectangular impulse response having the time length of the guard interval.

22. The OFDM demodulation method according to claim 16, wherein in said integrating operation, a time length of the guard interval and a predetermined time length before and after the guard interval are regarded as an integration section, and by integrating an incoming signal while sequentially shifting a location of the integration section with respect to the incoming signal, a response which monotonously increases before a rectangular impulse response having the time length of the guard interval and monotonously decreases after the rectangular response is provided.

23. The OFDM demodulation method according to claim 16, wherein said impulse response estimation operation comprises:

generating a signal identical to the synchronous symbol;

calculating a signal indicating a correlation between a signal generated in said generating operation and the OFDM signal; and calculating a correlation from the signal obtained in said calculating operation.

24. The OFDM demodulation method according to claim 23, wherein in said calculating operation, calculating an absolute value of a complex vector (i, q) of the incoming signal.

25. The OFDM demodulation method according to claim 23, wherein in said calculating operation, calculating a sum of an absolute value of i and an absolute value of q from a complex vector (i, q) of the incoming signal.

26. The OFDM demodulation method according to claim 23, wherein in said calculating operation, calculating a sum of a square of i and a square of q from a complex vector (i, q) of the incoming signal.

27. The OFDM demodulation method according to claim 16, wherein said impulse response estimation operation comprises:

generating a frequency-domain signal identical to the synchronous symbol;

multiplying a signal obtained in said Fourier-transform operation and the frequency-domain signal generated in said generating operation;

inverse-Fourier-transforming a signal obtained in said multiplying operation into an inverse-Fourier-transformed signal; and calculating a correlation from a signal obtained in said inverse-Fourier-transforming operation.

28. The OFDM demodulation method according to claim 27, wherein in said calculating operation, calculating an absolute value of a complex vector (i, q) of the incoming signal.

29. The OFDM demodulation method according to claim 27, wherein in said calculating operation, calculating a sum of an absolute value of i and an absolute value of q from a complex vector (i, q) of the incoming signal.

30. The method for OFDM demodulation according to claim 27, wherein in said calculating operation, calculating a sum of a square of i and a square of q from a complex vector (i, q) of the incoming signal.

31. An OFDM demodulation apparatus for demodulating an OFDM signal which includes a specific synchronous symbol and an OFDM data symbol structured by a valid symbol period and a guard interval, the OFDM data symbol being generated from a plurality of subcarriers, said apparatus comprising:

an impulse response estimator operable to estimate an impulse response from the OFDM signal based on the synchronous symbol;

an integrator operable to integrate an output obtained by estimation in said impulse response estimator;

a determiner operable to detect symbol timing indicating a period where an output obtained by integration in said integrator is maximum;

a window timing generator operable to generate, according to the symbol timing, window timing including information which is capable of providing the valid symbol period; and a separator operable to separate the OFDM signal into the plurality of subcarriers according to the window timing.

32. An OFDM demodulation method for demodulating an OFDM signal which includes a specific synchronous symbol and an OFDM data symbol structured by a valid symbol period and a guard interval, the OFDM data symbol being generated from a plurality of subcarriers, said method comprising:

an impulse response estimation operation of estimating an impulse response from the OFDM signal based on the synchronous symbol;

an integration operation of integrating an output obtained by estimation in said impulse response estimation operation;

a determination operation of detecting symbol timing indicating a period where an output obtained by integration in said integration operation is maximum;

a window timing generation operation of generating, according to the symbol timing, window timing including information which is capable of providing the valid symbol period; and a separation operation of separating the OFDM signal into the plurality of subcarriers according to the window timing.

* * * * *